(12) United States Patent
Nimura et al.

(10) Patent No.: US 7,248,377 B2
(45) Date of Patent: Jul. 24, 2007

(54) IMAGE FORMING APPARATUS THAT PROVIDES INSERT SHEET IN PROPER ORDER, METHOD OF CONTROLLING THE SAME, AND STORAGE MEDIUM THEREFOR

(75) Inventors: Mitsuo Nimura, Kashiwa (JP); Shinichi Nakamura, Kawasaki (JP); Naoyuki Ohki, Nerima-ku (JP); Norifumi Miyake, Kashiwa (JP); Kiyoshi Okamoto, Toride (JP); Takayuki Fujii, Toshima-ku (JP); Tsuyoshi Moriyama, Toride (JP)

(73) Assignee: Canon Kabushiki Kaisha (JP)

( * ) Notice: Subject to any disclaimer, the term of this patent is extended or adjusted under 35 U.S.C. 154(b) by 899 days.

(21) Appl. No.: 09/778,993

(22) Filed: Feb. 7, 2001

(65) Prior Publication Data

US 2001/0021036 A1    Sep. 13, 2001

(30) Foreign Application Priority Data

Feb. 7, 2000    (JP)    ............................ 2000-029293

(51) Int. Cl.
G06F 15/00    (2006.01)
G06K 1/00    (2006.01)
(52) U.S. Cl. ...................... 358/1.12; 358/1.12; 358/1.9
(58) Field of Classification Search ............... 358/1.12, 358/1.1, 1.15, 1.9, 1.11–1.18; 700/17, 84; 399/81, 403
See application file for complete search history.

(56) References Cited

U.S. PATENT DOCUMENTS

| 4,602,776 A | * | 7/1986 | York et al. ................. 271/4.01 |
| 4,734,865 A | | 3/1988 | Scullion et al. |
| 5,124,731 A | * | 6/1992 | Knodt et al. ................. 347/129 |
| 5,159,546 A | * | 10/1992 | Inoue et al. .................. 700/17 |
| 5,207,412 A | * | 5/1993 | Coons et al. .............. 270/1.02 |
| 5,272,511 A | | 12/1993 | Conrad et al. |
| 5,435,544 A | | 7/1995 | Mandel |
| 5,488,223 A | * | 1/1996 | Austin et al. ................ 235/375 |
| 5,710,968 A | | 1/1998 | Clark et al. |

(Continued)

FOREIGN PATENT DOCUMENTS

JP    01-038374    2/1989

(Continued)

*Primary Examiner*—Gabriel Garcia
*Assistant Examiner*—Thierry L. Pham
(74) *Attorney, Agent, or Firm*—Rossi, Kimms & McDowell LLP

(57) ABSTRACT

There are provided an image forming apparatus and a method of controlling the same are provided, which are capable of conveying an insert sheet of a proper page in carrying out a recovery process and simplifying the recovery process, and a storage medium storing a program for executing the method. When a printing start instruction is input and an insert mode has been set, an insert sheet is fed. It is determined whether the insert sheet is for a top page of a copy (bundle) or not. When the insert sheet for the top page is detected, a proper printing operation in the insert mode is started. If the insert sheet is not determined to be for the top page, it is judged that the insert sheet has not been correctly set on the inserter tray, and then the insert sheet is discharged to a non-sort tray. Then, insert sheets are discharged to the non-sort tray until the insert sheet for the top page is detected.

22 Claims, 16 Drawing Sheets

U.S. PATENT DOCUMENTS

| | | |
|---|---|---|
| 5,826,869 A | 10/1998 | Nyffenegger et al. |
| 6,097,497 A * | 8/2000 | McGraw .................... 358/1.12 |
| 6,118,544 A * | 9/2000 | Rao .......................... 358/1.18 |
| 6,353,479 B1 * | 3/2002 | Lubawy et al. ............ 358/1.13 |
| 6,625,508 B1 | 9/2003 | Purvis |
| 6,765,685 B1 * | 7/2004 | Yu ............................ 358/1.13 |
| 2001/0018626 A1 | 8/2001 | Moriyama et al. |

FOREIGN PATENT DOCUMENTS

| | | |
|---|---|---|
| JP | 9-114150 A | 5/1997 |

* cited by examiner

S-STACKING MODE

F-STACKING MODE

ORIGINAL

IMAGE FORMING APPARATUS THAT PROVIDES INSERT SHEET IN PROPER ORDER, METHOD OF CONTROLLING THE SAME, AND STORAGE MEDIUM THEREFOR

BACKGROUND OF THE INVENTION

1. Field of the Invention

The present invention relates to an image forming apparatus which is provided with an image forming means and has an insert function of conveying insert sheets directly from an inserter tray bypassing the image forming means to be inserted between output sheets having images formed thereon by the image forming means, a method of controlling the image forming apparatus, and a storage medium storing a program for executing the method.

2. Prior Art

There has been conventionally known an image forming apparatus which is provided with an image forming means and has an insert function of conveying insert sheets directly from an inserter tray bypassing the image forming means to be inserted between output sheets having images formed thereon by the image forming means.

In the conventional image forming apparatus, although an output mode such as a cover sheet mode, an interleaved sheet mode, or other modes can be designated as a manner of feeding sheets from an inserter tray, a manner of stacking sheets on the inserter tray cannot be designated, which may give rise to problems depending upon the state of stacked sheets. For example, when an insert sheet or other sheets have jammed and can no longer be used, usually, a recovery process is carried out by conveying another insert sheet of the same page from the inserter tray to replace the insert sheet involved in the jam. In the conventional image forming apparatus, however, there is a possibility that an insert sheet of a wrong page is selected from among sheets stacked on the inserter tray and conveyed.

Further, in the conventional image forming apparatus, both ordinary sheets on which images are to be formed by the image forming means and insert sheets are successively conveyed, so that the above recovery process needs to be carried out both on the image forming means and means for conveying insert sheets, which requires considerable labor and time by the user and complicates the control operation.

SUMMARY OF THE INVENTION

It is an object of the present invention to provide an image forming apparatus and a method of controlling the same that are capable of conveying an insert sheet of a proper page in carrying out a recovery process and simplifying the recovery process, and a storage medium storing a program for executing the method.

To attain the above object, in a first aspect of the present invention, there is provided an image forming apparatus comprising reading means for reading images recorded on originals, image forming means for forming images on blank sheets based on the read images, stacking means for stacking a plurality of insert sheets which are fed in a manner bypassing image formation by the image forming means and inserted between the sheets having images formed thereon by the image forming means, inserter means for reading out the stacked insert sheets and inserting same between the sheets having images formed thereon, designating means for designating at least one position in the sheets having images formed thereon for insertion of at least one of the insert sheets by the inserter means, detecting means for detecting an insert sheet to be inserted first when a plurality of positions have been designated by the designating means, and discharging means operable when the detecting means detects that the insert sheet read out by the inserter means is not the insert sheet to be inserted first, for discharging insert sheets from the stacking means until the insert sheet to be inserted first is detected.

Further, in the first aspect, there are also provided a control method of controlling an image forming apparatus, comprising the steps of reading images recorded on originals by reading means, forming images on blank sheets based on the read images by image forming means, reading out insert sheets from a plurality of insert sheets stacked by stacking means, which are fed in a manner bypassing image formation by the image forming means and inserted between the sheets having images formed thereon by the image forming means and inserting the read out insert sheets between the sheets having images formed thereon by the image forming means, by inserter means, designating at least one position in the sheets having images formed thereon for insertion of at least one of the insert sheets by the inserter means, by designating means, detecting an insert sheet to be inserted first by detecting means when a plurality of positions have been designated by the designating means, and discharging insert sheets from the stacking means until the insert sheet to be inserted first is detected, by discharging means when the detecting means detects that the insert sheet read out by the inserter means is not the insert sheet to be inserted first, and a machine readable storage medium storing instructions of a program for causing a computer to execute the image processing method.

According to the first aspect, when the detecting means detects that the insert sheet read out by the inserter means is not the insert sheet to be inserted first, insert sheets are discharged from the stacking means until the insert sheet to be inserted first is detected. As a result, even when insert sheets are inserted in an incorrect order, the page order can be recovered correctly.

To attain the above object, in a second aspect of the present invention, there is provided an image forming apparatus comprising reading means for reading images recorded on originals, image forming means for forming images on blank sheets based on the read images, stacking means for stacking a plurality of insert sheets which are fed in a manner bypassing image formation by the image forming means and inserted between the sheets having images formed thereon by the image forming means, inserter means for reading out the stacked insert sheets and inserting same between the sheets having images formed thereon, designating means for designating at least one position in the sheets having images formed thereon for insertion of at least one of the insert sheets by the inserter means, detecting means for detecting an insert sheet to be inserted first when a plurality of positions have been designated by the designating means, interrupting means for interrupting a sheet inserting operation of the inserter means when at least one of the insert sheets has jammed while being inserted by the inserter means, and discharging means operable when the detecting means detects that the insert sheet read out by the inserter means is not the insert sheet to be inserted first after the apparatus has recovered from the interruption by removing the at least one jammed insert sheet, for discharging insert sheets from the stacking means until the insert sheet to be inserted first is detected, and for further discharging insert sheets from the stacking means up to an insert sheet immediately preceding a same type of sheet as the at least one jammed insert sheet.

Further, in the second aspect, there are also provided a control method of controlling an image forming apparatus, comprising the steps of reading images recorded on originals by reading means, forming images on blank sheets based on the read images by image forming means, reading out insert sheets from a plurality of insert sheets stacked by stacking means, which are fed in a manner bypassing image formation by the image forming means and inserted between the sheets having images formed thereon by the image forming means and inserting the read out insert sheets between the sheets having images formed thereon by the image forming means, by inserter means, designating at least one position in the sheets having images formed thereon for insertion of at least one of the insert sheets by the inserter means, by designating means, detecting an insert sheet to be inserted first by detecting means when a plurality of positions have been designated by the designating means, interrupting a sheet inserting operation of the inserter means by interrupting means when at least one of the insert sheets has jammed while being inserted by the inserter means, and discharging insert sheets from the stacking means until the insert sheet to be inserted first is detected, and further discharging insert sheets from the stacking means up to an insert sheet immediately preceding a same type of sheet as the at least one jammed insert sheet, by discharging means, when the detecting means detects that the insert sheet read out by the inserter means is not the insert sheet to be inserted first after the apparatus has recovered from the interruption by removing the at least one jammed insert sheet, and a machine readable storage medium storing instructions of a program for causing a computer to execute the image processing method.

According to the second aspect, when the detecting means detects that the insert sheet read out by the inserter means is not the insert sheet to be inserted first after the apparatus has recovered from the interruption by removing the at least one jammed insert sheet, insert sheets are discharged from the stacking means until the insert sheet to be inserted first is detected, and insert sheets are further discharged from the stacking means up to an insert sheet immediately preceding the same type of sheet as the at least one jammed insert sheet. As a result, even when insert sheets are inserted in an incorrect order after recovery from a jam of an insert sheet or sheets, the page order can be recovered correctly.

To attain the above object, in a third aspect of the present invention, there is provided an image forming apparatus comprising reading means for reading images recorded on originals, image forming means for forming images on blank sheets based on the read images, stacking means for stacking a plurality of insert sheets which are fed in a manner bypassing image formation by the image forming means and inserted between the sheets having images formed thereon by the image forming means, inserter means for reading out the stacked insert sheets and inserting same between the sheets having images formed thereon, mixed stacking means for stacking in a mixed fashion the sheets having images formed thereon by the image forming means and insert sheets to be inserted by the inserter means between the sheets having images formed thereon, insert sheet discharging detecting means for detecting that the insert sheets have been discharged to the mixed stacking means, and sheet feeding control means responsive to detection of discharging of the insert sheets by the insert sheet discharging detecting means, for controlling such that feeding of the blank sheets to the image forming means be started.

Further, in the third aspect, there are also provided a control method of controlling an image forming apparatus, comprising the steps of reading images recorded on originals by reading means, forming images on blank sheets based on the read images by image forming means, reading out insert sheets from a plurality of insert sheets stacked by stacking means, which are fed in a manner bypassing image formation by the image forming means and inserted between the sheets having images formed thereon by the image forming means and inserting the read out insert sheets between the sheets having images formed thereon by the image forming means, by inserter means, detecting by insert sheet discharging detecting means that the insert sheets have been discharged to mixed stacking means that stacks in a mixed fashion the sheets having images formed thereon by the image forming means and insert sheets to be inserted by the inserter means between the sheets having images formed thereon, and starting feeding of the blank sheets to the image forming means in response to detection of discharging of the insert sheets by the insert sheet discharging detecting means, and a machine readable storage medium storing instructions of a program for causing a computer to execute the image processing method.

According to the third aspect, when insert sheet discharging detecting means detects that insert sheets have been discharged to mixed stacking means that stacks in a mixed fashion the sheets having images formed thereon by the image forming means and insert sheets to be inserted by the inserter means between the sheets having images formed thereon, feeding of the blank sheets to the image forming means is started. As a result, even when an insert sheet or sheets have jammed, a recovery process therefor can be promptly carried out.

To attain the above object, in a fourth aspect of the present invention, there is provided an image forming apparatus comprising reading means for reading images recorded on originals, image forming means for forming images on blank sheets based on the read images, stacking means for stacking a plurality of insert sheets which are fed in a manner bypassing image formation by the image forming means and inserted between the sheets having images formed thereon by the image forming means, inserter means for reading out the stacked insert sheets and inserting same between the sheets having images formed thereon, mixed stacking means for stacking in a mixed fashion the sheets having images formed thereon by the image forming means and insert sheets to be inserted by the inserter means between the sheets having images formed thereon, image formed sheet discharging detecting means for detecting that the sheets having image formed thereon have been discharged to the mixed stacking means, and reading control means responsive to detection of discharging of the insert sheets by the image formed sheet discharging detecting means, for controlling such that reading of the insert sheets by the inserter means be started.

Further, in the fourth aspect, there are also provided A control method of controlling an image forming apparatus, comprising the steps of reading images recorded on originals by reading means, forming images on blank sheets based on the read images by image forming means, reading out insert sheets from a plurality of insert sheets stacked by stacking means, which are fed in a manner bypassing image formation by the image forming means and inserted between the sheets having images formed thereon by the image forming means and inserting the read out insert sheets between the sheets having images formed thereon by the image forming means, by inserter means, detecting by insert sheet discharging detecting means that the insert sheets have been discharged to mixed stacking means that stacks in a mixed fashion the sheets having images formed thereon by the image forming means and insert sheets to be inserted by the inserter means between the sheets having images formed thereon, and starting reading reading of the insert sheets by the inserter means in response to detection of discharging of the insert sheets by the image formed sheet discharging detecting means, and a machine readable storage medium storing instructions of a program for causing a computer to execute the image processing method.

According to the fourth aspect, when insert sheet discharging detecting means detects that insert sheets have been discharged to mixed stacking means that stacks in a mixed fashion the sheets having images formed thereon by the image forming means and insert sheets to be inserted by the inserter means between the sheets having images formed thereon, reading reading of the insert sheets by the inserter means is started. As a result, even when a blank sheet or sheets have jammed, a recovery process therefor can be promptly carried out.

The above and other objects, features, and advantages of the invention will become more apparent from the following detailed description taken in conjunction with the accompanying drawings.

DETAILED DESCRIPTION OF PREFERRED EMBODIMENTS

The present invention will now be described in detail with reference to drawings showing embodiments thereof.

Figure 1:
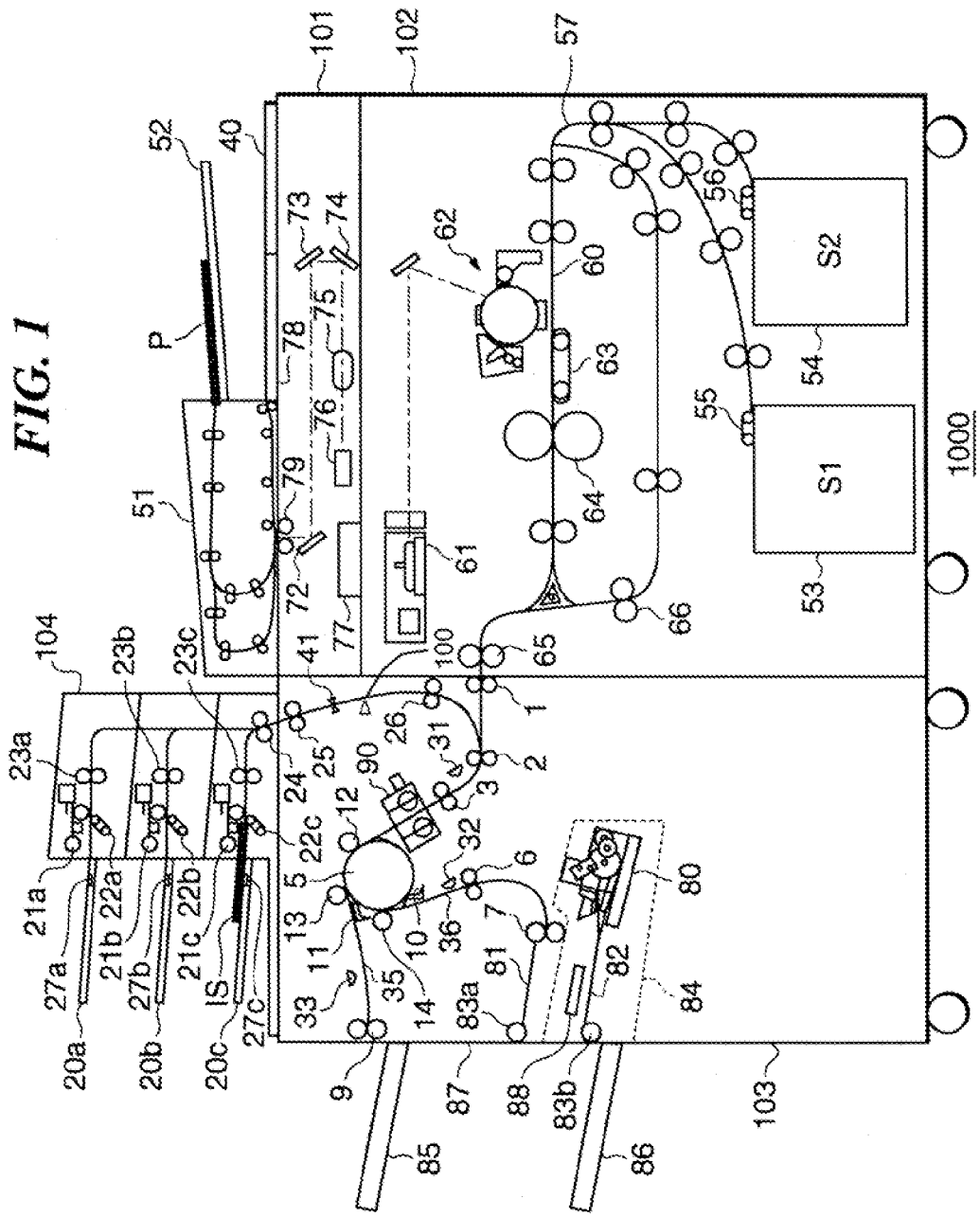
FIG. 1 is a longitudinal sectional view showing the construction of an image forming apparatus according to an embodiment of the present invention.

FIG. 1 is a longitudinal sectional view showing the construction of an image forming apparatus according to an embodiment of the present invention.

As shown in FIG. 1, the image forming apparatus 1000 is comprised of an automatic original feeder 51, a reader section 101, a printer section 102, and a sheet processing section 103. The reader section 101 reads an original P fed from an original stacking tray 52 to a predetermined position on a platen glass 78 by the automatic original feeder 51.

The reader section 101 is comprised of a lamp 79 for illuminating the original P that has been conveyed to the predetermined position on the platen glass 78 by the automatic original feeder 51, a plurality of reflecting mirrors 72, 73, 74 for directing reflected light from the original P to a CCD 76, and a lens 75 for focusing the light reflected from the original P and directed by the mirrors 72, 73, 74 on an image plane of the CCD 76. The CCD 76 is comprised of color line sensors for obtaining respective analog color signals for R (red), G (green), and B (blue) independently, amplifiers for amplifying the respective analog color signals, and A/D converters for converting the respective analog color signals into 8-bit digital signals. Each digital color signal output from the CCD 76 is input to an image signal controller 77.

The image signal controller 77 performs predetermined image processing on the digital color signal for each color, and has an additional function of determining whether the original that has been read is a color original or a black-and-white original. The detailed construction of the image signal controller 77 will be described later. The signals having been subjected to the predetermined processing by the image signal controller 77 are input to the printer section 102.

The printer section 102 includes an exposure controller 61 which scans a laser beam based on the signals input from the image signal controller 77 to form an electrostatic latent image on a photosensitive drum of an image forming unit 62. The image forming unit 62 performs an image forming process based on an electrophotographic method in which the electrostatic latent image formed on the photosensitive drum is developed by a corresponding color toner into a visible image, and this color-toner image is then transferred onto a recording sheet S. The image forming process based on the electrophotographic method is already known, and no further description thereof will not be given.

Here, the recording sheet S is a recording sheet contained in a cassette 53 or a cassette 54. Recording sheets contained in cassettes 53, 54 are fed by sheet feeding rollers 55, 56, and conveyed via a conveyance path 57 and a register roller 60 to the image forming unit 62.

The recording sheet S with the toner image transferred thereto is conveyed to a fixing device 64, where the toner image is fixed to the recording sheet S by applying heat and pressure to the recording sheet S. The image is thus formed on the recording sheet S. The recording sheet S with the image formed thereon is conveyed to the sheet processing section 103 via a sheet discharging roller 65. In a duplex mode where images are formed on both surfaces of the recording sheet S, the recording sheet having an image formed on one surface thereof is fed via a double-faced conveyance path 66 again to the image forming unit 62, and after an image has been formed on the other surface, is conveyed via the sheet discharging roller 65 to the sheet processing section 103.

The sheet processing section 103 includes an entrance roller 1, a plurality of conveyance rollers 2, 3, and a sensor 31 disposed between the conveyance rollers 2 and 3. The sheet processing section 103 is provided with an inserter 104 for executing an insert process of inserting insert sheets that are set on a tray 20 between recording sheets S conveyed from the printer section 102.

Assuming that insert sheets I are set on the tray 20 of the inserter 104 by the user with front surfaces thereof facing upward, the insert sheets are successively fed by sheet feeding rollers 21 starting with the topmost sheet. Thus, the sheets from the inserter 104 are conveyed via conveyance rollers 23, 24, 25, as they are, to a sample tray 85 or to a stack tray 86, and discharged there with the front surfaces facing downward.

A plurality of originals P are set on the original stacking tray 52 with front surfaces thereof facing upward. In the reader section 101, a reading process is performed to successively read the originals starting with the topmost page.

When recording sheets with images formed thereon by the printer section 102 are to be fed to the sheet processing section 103 with the image formed surfaces facing downward, the recording sheets are first fed toward a conveyance roller 66, and then switched back to be fed to the sheet processing section 103. When the recording sheets are to be fed to the sheet processing section 103 with the image formed surfaces facing upward, the recording sheets are not fed toward the conveyance roller 66 for switch-back, but are fed straight as they are to the sheet processing section 103.

Thus, when insert processing is performed using the inserter 104, recording sheets are switched back in the printer 102 and then fed to the sheet processing section 103 with the image formed surfaces facing downward, and in the sheet processing section 103 the recording sheets are discharged as they are to the sample tray 85 or the stack tray 86 with the image formed surfaces facing downward. In this way, insert sheets I from the inserter 104 and recording sheets S from the printer section 102 are discharged with their surfaces facing in the same direction.

The tray 20 on which insert sheets I to be inserted are set is comprised of three inserter trays 20*a*, 20*b* and 20*c*, and each inserter is provided with its own inserter tray to permit insert sheets to be stacked independently.

The sheet feeding rollers 21*a*, 21*b* and 21*c* are for feeding insert sheets I. Normally, the sheet feeding rollers 21 are set on standby in a position separated from insert sheets, and in the timing of sheet feeding, are seated onto the insert sheets by turning on a sheet feeding solenoid, not shown. Separation rollers 22*a*, 22*b* and 22*c* are for separating insert sheets I fed by the sheet feeding rollers 21*a*, 21*b* and 21*c*. Sensors 27*a*, 27*b* and 27*c* are for determining whether insert sheets I are set on the respective trays 20*a*, 20*b* and 20*c* or not. Insert sheets I from the separation rollers 22 are conveyed via conveyance rollers 23*a*, 23*b*, 23*c*, 24, 25, 26, to the conveyance roller 2.

A bar code reader 100 is provided between the conveyance rollers 25 and 26. By reading a bar code assigned to the top page of the conveyed insert sheets I, the bar code reader 100 detects whether the insert sheet I is the top page or not. The method of detecting whether the insert sheet I is for the top page or not is not limited to this. Suitable means may be constructed using a CCD for reading a page number assigned to each insert sheet I to determine whether it is for the top page or not according to the page number.

The recording sheets S or insert sheets I conveyed by the conveyance rollers 2, 3 are punched with a punch unit 50 as required, and then wound onto a buffer roller 5. Arranged around the buffer roller 5 are a plurality of depressing rollers 12, 13, 14 for pushing the recording sheet S or the insert sheet I to the buffer roller 5 as well as switching flappers 10, 11. According to a switching action of the switching flapper 11, the recording sheet S or insert sheet I is selectively sent to a non-sort path 35 or a sort path 36. According to a switching action of the switching flapper 10, the recording sheet S or insert sheet I is selectively sent to a buffer path 23 or to the sort path 36. A sensor 32 is provided on the buffer path 23 to detect the recording sheet S or insert sheet I.

A sensor 33 is provided on the non-sort path 35 to detect the recording sheet S or insert sheet I. The recording sheet S or insert sheet I that has been led to this non-sort path 35 is discharged through a discharging roller 9 onto the sample tray 85.

The recording sheet S or insert sheet I that has been led to the sort path 36 is led via a conveyance roller 6 to a processing tray section 84. The processing tray section 84 includes an intermediate tray 82 which accumulates and aligns recording sheets S or inserter sheets I. Recording sheets S and insert sheets I accumulated in a bundle on the intermediate tray 82 are aligned by an aligning plate 88, and may be subjected to a staple process by a staple unit 80 as required. The bundle of aligned sheets on the intermediate tray 82 is discharged and stacked onto the stack tray 86 by a discharging roller 83*a* that is brought into abutment with the bundle when a rocking guide 81 is closed, and a discharging roller 83*b* opposed to the roller 83*a*.

The sheet bundle stacked on the sample tray 85 or the stack tray 86 abuts at its trailing edge against a bundle stacking guide 87 for alignment. The bundle stacking guide 87 also serves as an exterior of the sheet processing section 103.

The reader section 101 is provided with an operation section 40 for performing input operations for the entire apparatus. The operation section 40 includes a display panel for displaying current settings of functions related to image formation and an information input screen view for entering setting information for each function, and keys for entering setting information for each function. The detailed construction of the operation section 40 will be described later.

Figure 2:
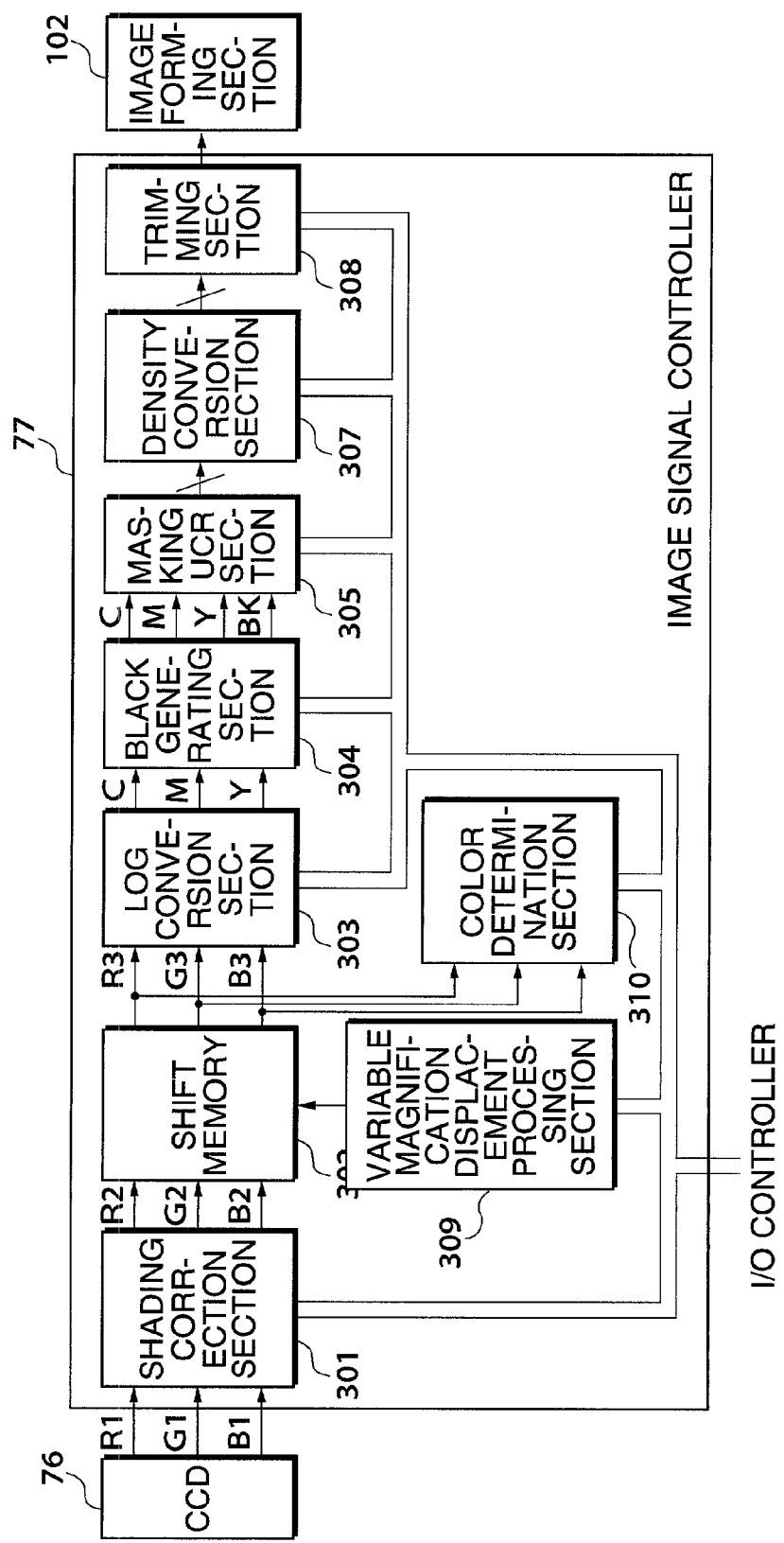
FIG. 2 is a block diagram showing the construction of an image signal controller of FIG. 1.
Figure 3:
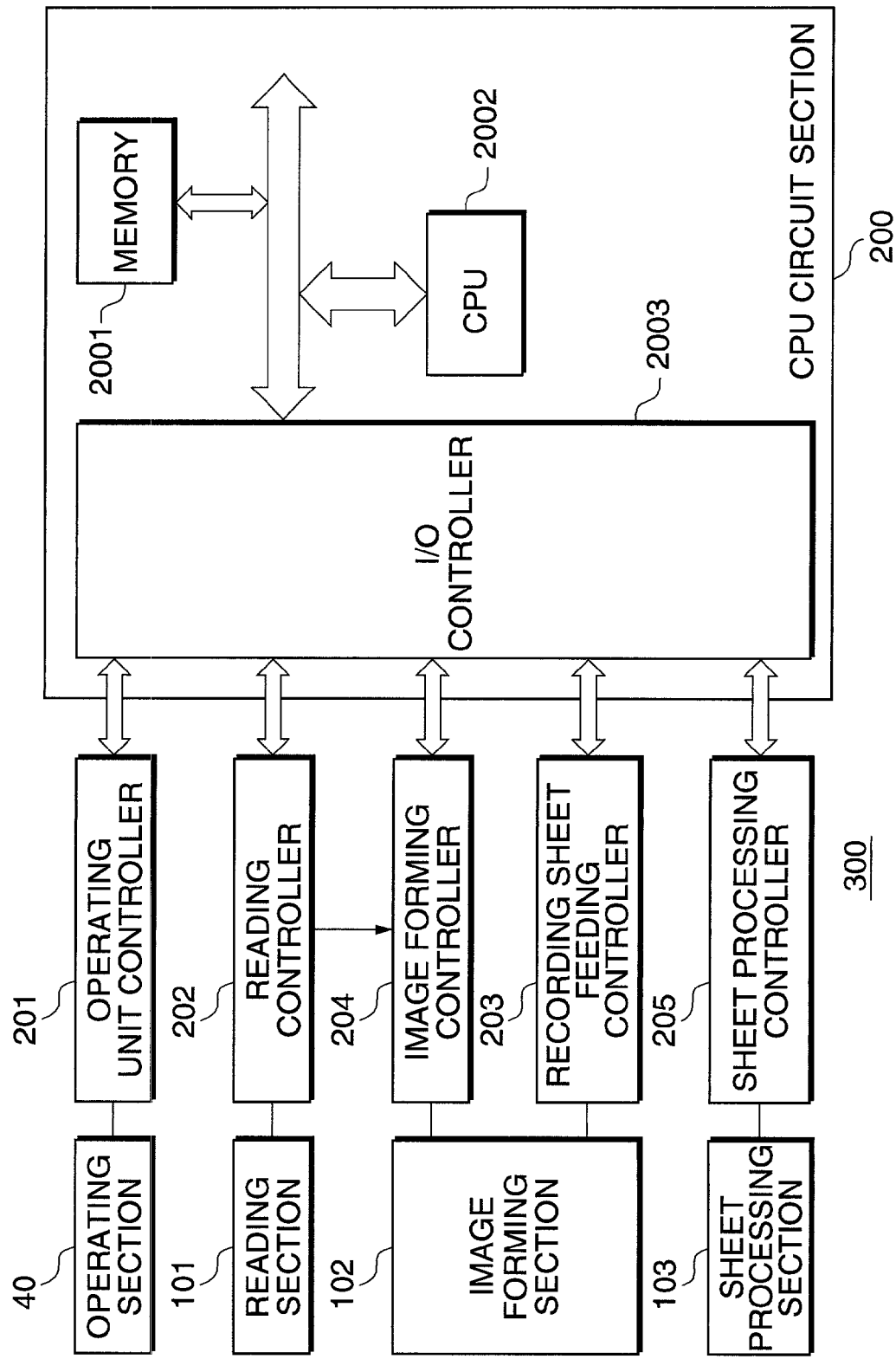
FIG. 3 is a block diagram showing the functional construction of the image forming apparatus of FIG. 1.

The image forming apparatus according to the present embodiment is constructed so as to perform a copy function, a printer function and a facsimile function. The construction of the present embodiment to realize these functions will be described with reference to FIGS. 2 through 5. FIG. 2 is a block diagram showing the construction of the image signal controller 77 in FIG. 1, and FIG. 3 is a block diagram showing the functional construction of the image forming apparatus of FIG. 1.

The image signal controller 77 includes, as shown in FIG. 2, a shading correction section 301 to which color signals R1, G1, B1 are input from the CCD 76, and which performs shading correction on each of the input color signals to correct for irregularity of light distribution, irregularity of the sensitivity of CCD 76, and the like. The resulting color signals R2, G2, B2 that have been subjected to the shading correction are input to a shift memory section 302. The shift memory section 302 performs correction for differences between colors and between pixels on each input color signal. Variable magnification processing and displacement processing may be performed as required on each color signal that is stored in the shift memory section 302 by a variable magnification and displacement processing section 309. The color signals R3, G3, and B3 from the shift memory section 302 are input to a LOG conversion section 303, and also to a color determination section 310, described later.

The LOG conversion section 303 converts the input color signals R, G, B into Y, M, C density signals. The Y, M, C density signals are input to a black generating section 304, which generates a black (BK) signal based on the input density signals. The BK density signal is input, together with the Y, M, C density signals, to a masking UCR section 305, which performs corrections on the input density signals with respect to color filter characteristics and density characteristics, and selects one density signal to be developed from among the corrected density signals, and outputs the same. The density signal that is output from the masking UCR section 305 is input to a density conversion section 307, which performs density conversion on the input density signal based on a set density. Image data after the density conversion are input to a trimming processor 308, which executes an editing process on a set section of the image data, and the image data after the editing process are output to the printer section 102.

The color determination section 310 calculates ratios of the color signals based on the input color signals R3, G3, B3, and determines according to the signal ratios whether the read image is chromatic or achromatic, that is, whether the original is a color original or a black-and-white original. Here, the color signals input to the color determination section 310 are those of the image read by a preliminary reading of the original. The achromatic image means that the ratios of the color signals R3, G3, B3 are the same, where the differences between the color signals R3, G3, B3 are small. Thus, the difference between color signals R3 and G3 and the difference between color signals G3 and B3 are calculated. When each of the differences is less than a predetermined value, it is determined that the read image is achromatic, and when either of the differences is not less than the predetermined value, it is determined that the read image includes a chromatic color. When a color original reading mode has been set, the apparatus is controlled such that reading is performed by the reader section 101 only on color originals based on the result of the determination by the color determination section 310 and reading is not performed on black-and-white originals which are thus simply discharged to outside. Similarly, when a black-and-white original reading mode has been set, the apparatus is controlled such that reading is performed only on black-and-white originals based on the result of the determination by the color determination section 310 and reading is not performed on color originals which are thus simply discharged to outside.

The image forming apparatus 1000 includes, as shown in FIG. 3, a CPU circuit section 200 that controls the entire apparatus, and includes a central processing section (CPU) 2002 for executing predetermined processes according to various control programs stored in a memory 2001. An operation section controller 201, a reading controller 202, a recording sheet feeding controller 203, an image formation controller 204 and a sheet processing controller 205 are connected via an I/O controller 2003 to the CPU 2002 to be controlled by the same.

The operation section controller 201 serves as an interface with the operation section 40 and executes transfer of image data to be displayed to the operation section 40 and transfer of signals generated by operating inputs to the operation section 40 to the CPU 2002.

Next, the operation of the operation section 40 will be described.

Figure 4:
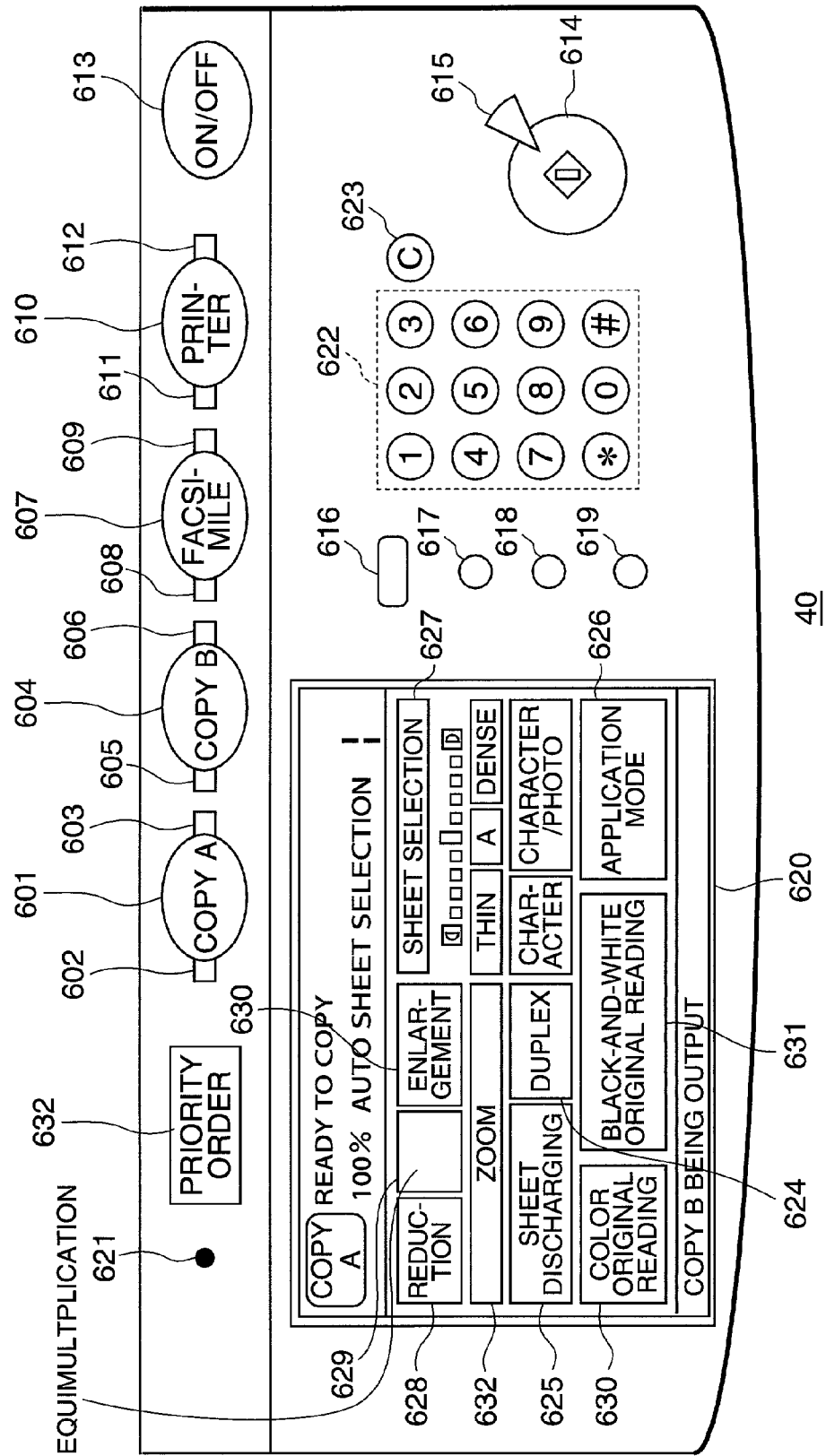
FIG. 4 is a view showing the construction of an operation section provided in the image forming apparatus of FIG. 1.

FIG. 4 is a view showing the surface layout of the operating section 40 of the copying apparatus 1000.

In FIG. 4, a power lamp 621 is provided for indicating that power supply is turned on. A power switch 613 is turned on and off in response to on and off of the power supply. A ten key 622 is used for numerical input for setting the number of image formed sheets, setting operating modes, etc. The ten key 622 is also used for entering telephone numbers in a screen view for facsimile setting. A clear key 623 is used for clearing the settings input by the ten key 622. A reset key 616 is used for initializing the set number of image formed sheets, modes such as operating modes and selected sheet feeding trays, etc. to default or initially set values.

A start key 614 causes start of the image forming operation when depressed. The start key 614 is provided at its center with red and green LEDs (not shown) to indicate whether the image forming operation can be started or not. If the image forming operation cannot be started, the red LED is turned on, and if the image forming operation can be started, the green LED is turned on. A stop key 615 is used to stop the copying operation. When a guide key 617 is depressed followed by depression of another key, an explanation of a function or functions that can be set by the other key is displayed on a display panel 620. To cancel this guide display, it suffices to depress the guide key 617 again. A user setting key 618 is used by the user for changing settings of the copying apparatus 1000. The settings that can be changed by the user using the key 618 are, for example, time before the settings of the copying apparatus 1000 are automatically cleared, and setting of the default values of the modes when the reset key 616 is depressed. An interrupt key 619, when depressed during an image forming operation, causes another image forming operation to be interrupted.

The display panel 620 is formed of a liquid crystal display or the like, and has display contents thereof switched as the mode is changed to facilitate detailed mode setting. The display panel 620 has a screen formed of a touch panel so that functions can be selected and executed by touching the insides of frames of respective displayed functions. In the example shown in FIG. 4, a view for setting a copying operating mode is displayed on the display panel 620. Keys 624, 625, 626, 627, 628, 629, 630, 631, and 632 are displayed on the display panel 620. The user can set operating modes of the copying apparatus 1000 by depressing these keys.

The key 627 is used for selecting types of sheets, and the keys 628, 629, 630, 632 are used for setting copying magnifications of the copying operation. The application mode key 626 is used for setting various application function modes such as a multiple operating mode, a reduced-size layout mode, a cover sheet mode, and an interleaved sheet mode. Upon depression of the application mode key 626, a view for setting various application function modes is displayed on the display panel 620. A user sets an application function mode on the displayed view. A duplex operation setting key 624 is used for setting a duplex operation. More specifically, the key 624 sets duplex copying modes, such as "single-double mode" in which a double-sided original is output from two single-sided originals, "double-double mode" in which a double-sided original is output from a double-sided original, and "double-single mode" in which two single-sided originals are output from a double-sided original.

A sheet discharging operation key 625 is used for setting an operating mode of the finisher 103, setting a recording sheet sorting mode using an image memory, and setting an insert mode for performing an insert operation. A color original reading key 630 is used for setting an original reading mode, that is, a mode in which only color originals are extracted from a plurality of originals P stacked on the original stacking tray 52 and processed. A black-and-white original reading key 631 is used for setting a mode in which only black-and-white originals are extracted from a plurality of originals P and processed.

When either the color original reading key 630 or the black-and-white original reading key 631 is depressed, the key indicating the selected mode is displayed in a black-and-white reversed manner so that the currently set original reading mode can be recognized at once. When the key displayed in the reversed manner is depressed, the corresponding mode is canceled and the key returns to a non-reversed display (normal display). In the initial state, both the color original reading key 630 and the black-and-white original reading key 631 are in the non-reversed display. On this occasion, an ordinary reading mode is set so that all the plurality of originals set on the original stacking tray 50 are processed irrespective of color originals or black-and-white originals.

Among the keys displayed on the display panel 620, those which cannot be used are displayed in dotted lines (hatched) to indicate the non-operable state of the keys. At a top position in the display panel 620, contents of the set copying operation or the current operative state are displayed to the extent that can be displayed in one line. In FIG. 4, a setting screen view of copy A is shown. At a bottom position in the display panel 620, the operative state of another function mode is displayed to the extent that can be displayed in one line. In FIG. 4, it is indicated that copy B is being output to the printer section.

A copy A function key 601, a copy B function key 604, a facsimile function key 607, and a printer function key 610 in FIG. 4 are function keys used for switching the displayed contents of the display panel 620 of the operating section 40 in order to set various functions for copying operation and system operation. These function keys are constructed in the form of semi-transparent buttons with indicator lamps (not shown) such as LEDs inside the keys. Only the lamp inside the key corresponding to the selected operating view is turned on.

Green LEDs 603, 606, 609, and 612 provided on the right side of the function keys 601, 604, 607, and 610 are controlled to be turned on so as to indicate the operative states of respective functions. For example, when the copy B function key 604 is depressed, the operating view for copy B is displayed on the display panel 620. The LED 606 for copy B is controlled to remain off while copy B is on standby. When copy B is being output as in FIG. 4, the LED 606 for copy B is controlled to blink. When the image of copy B is stored in the memory 2001 and printing of copy B is not being performed, the LED 606 for copy B is controlled to remain on.

Red LEDs 602, 605, 608, and 611 provided on the right side of the function keys 601, 604, 607, and 610 are controlled to be turned on so as to indicate occurrence of abnormal events in respective functions. For example, when an abnormal event such as interruption of the operation due to exhaustion of sheets or occurrence of a jam in copy B, the LED 605 is controlled to blink. In this state, if the copy B function key 604 is depressed to switch to the copy B function, the abnormal condition of copy B is displayed on the display panel 620 and details of the abnormal event can be recognized.

The above-mentioned function keys 601. 604, 607, and 610 can be depressed in any operative state to change the contents displayed on the display panel 620 to switch the operating section. The above-mentioned stop key 615, start key 614, reset key 616, etc. that are not found in the display panel 620 can perform respective operations corresponding to functions selected from the copy A function key 601, the copy B function key 604, the facsimile function key 607 and the printer key 610.

As shown in FIG. 4, for example, to stop the copying operation of the copy B while the operating view is displayed on the display panel 620, the copy B function key 604 is depressed to change the operating view, and then the stop key 615 is depressed to stop the copying operation of copy B. The contents of change made by the user setting key 618 are reflected upon the function selected at the time of change and therefore setting of the image forming apparatus can be set independently for each function.

Figure 5:
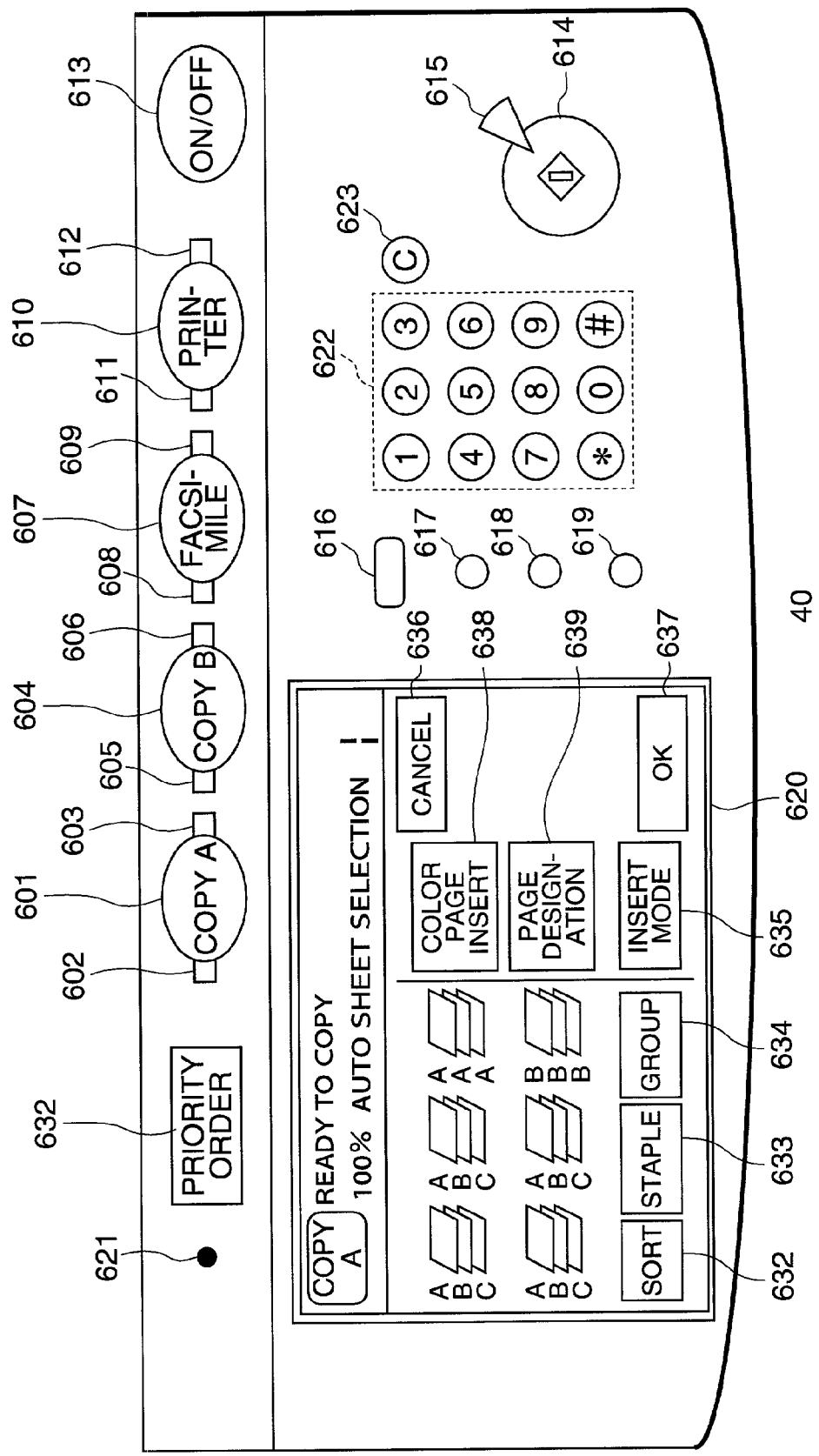
FIG. 5 is a view showing a switched screen view on a display panel of the operation section of FIG. 4.

FIG. 5 is a view showing a sheet discharging process setting view that is displayed on the display panel 620 when the sheet discharging process key 625 is depressed. A sheet discharging mode is selected on this setting view. A sort key 632 is used for setting a sheet discharging process in a sort mode, a staple key 633 is used for setting a staple processing mode for the sorted recording sheet, and a group key 634 is used for setting a group mode in which copy of an original is discharged to one bin.

Figure 6:
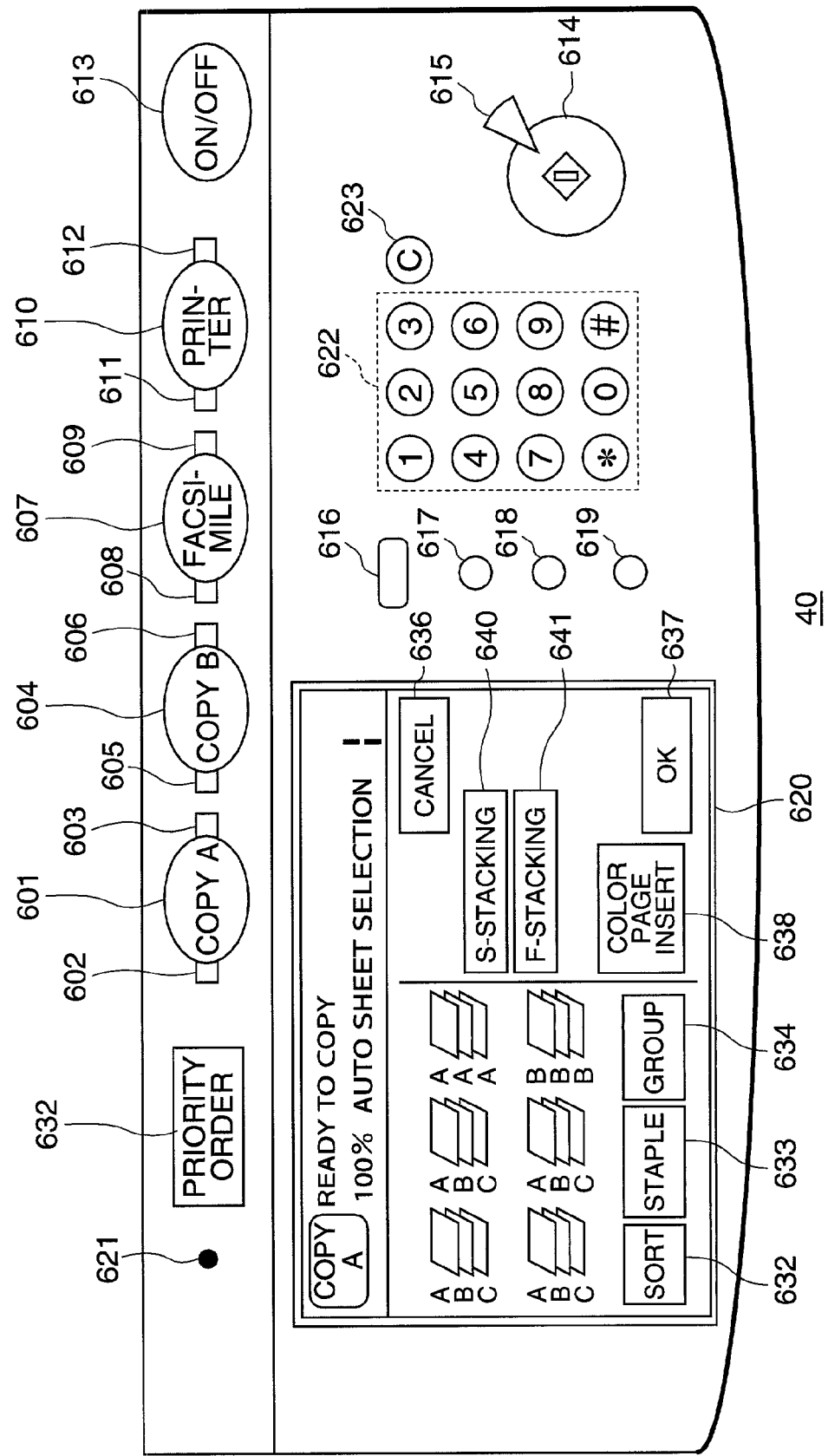
FIG. 6 is a view showing another switched screen view on the display panel of the operation section of FIG. 4.

An insert mode key 635 is used for setting an insert mode in which the inserter 104 is used to perform insert processing. In the initial state, a color page insert key 638 and a page designating key 639 are displayed in hatched display and cannot be selected. Only when the insert mode key 635 is selected, the hatching is released from the display so that it becomes possible to select these keys. If, at this point, the color page insert key 638 is depressed and selected, the display panel 620 changes to a screen view as shown in FIG. 6, where an S-stacking mode 640 and an F-stacking mode 641 can be selected. The S-stacking mode and F-stacking mode will be described later.

These keys for setting the sheet discharging mode are exclusive, and the sheet discharging mode can be selected from either mode.

A cancel key 636 is used for canceling the set sheet discharging mode. An OK key 637 is used for confirming the setting of sheet discharging mode selected on the screen view.

Figure 7A:
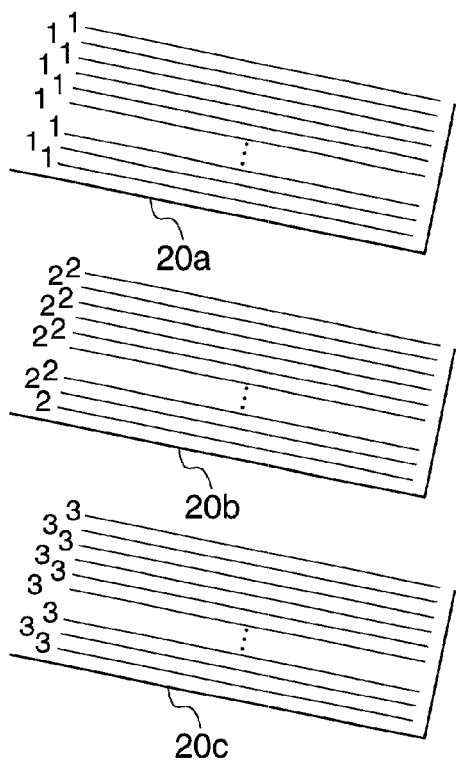
FIG. 7A is a view useful in explaining an S-stacking mode which can be selected on the display panel of the operation section of FIG. 6.
Figure 7B:
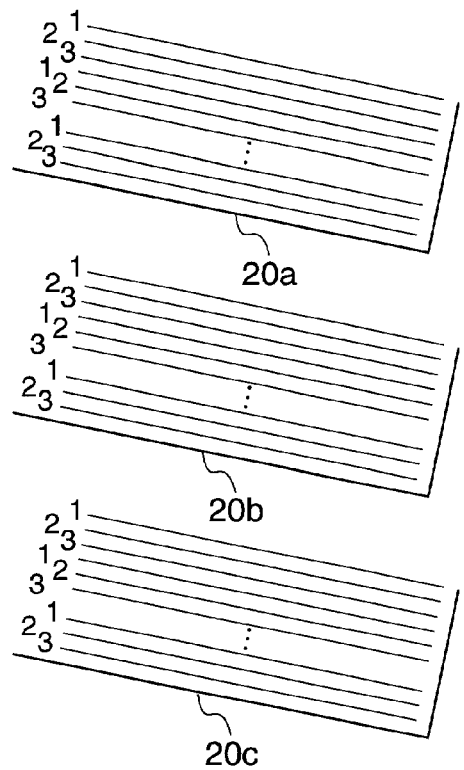
FIG. 7B is a view useful in explaining an F-stacking mode which can be selected on the display panel of the operation section of FIG. 6.

FIGS. 7A and 7B are views useful in explaining the above-mentioned S-stacking mode and F-stacking mode that can be selected by the operating section 40 in FIG. 6. When the number of pages to be inserted is three, for example, the S-stacking mode is defined as a mode in which, as shown in FIG. 7A, the same type (the same page) of insert sheets are stacked on each inserter tray and different types (different pages) of sheets are stacked on different inserter trays. The F-stacking mode is defined as a mode in which, as shown in FIG. 7B, a bundle of sheets for three pages are stacked in the order of page number on each inserter tray. Thus, insert sheets can be stacked on inserter trays in two different ways.

Figure 8:
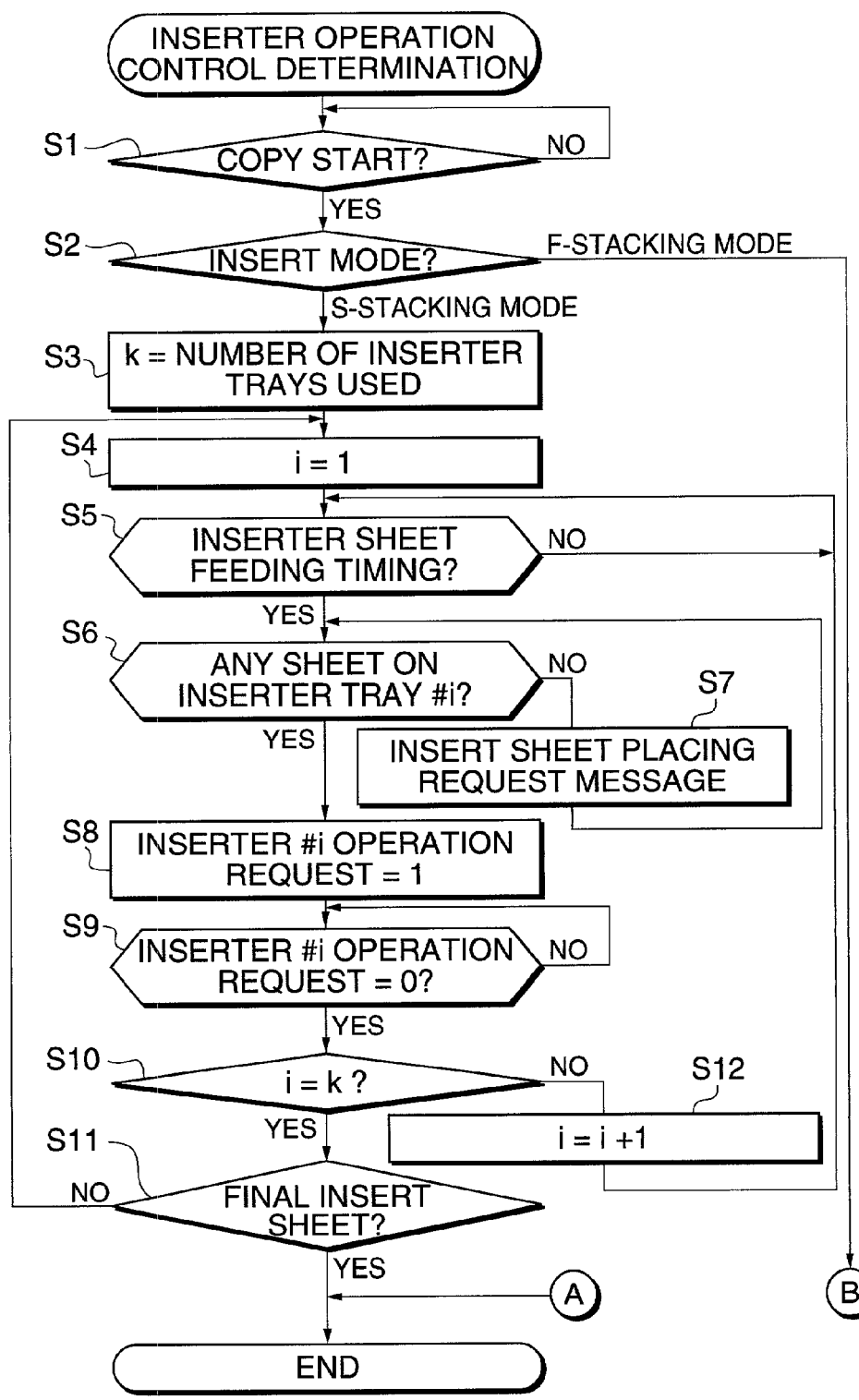
FIG. 8 is a flow chart showing a procedure of an inserter control process when an insert mode for inserting insert sheets is selected as a copying mode.
Figure 9:
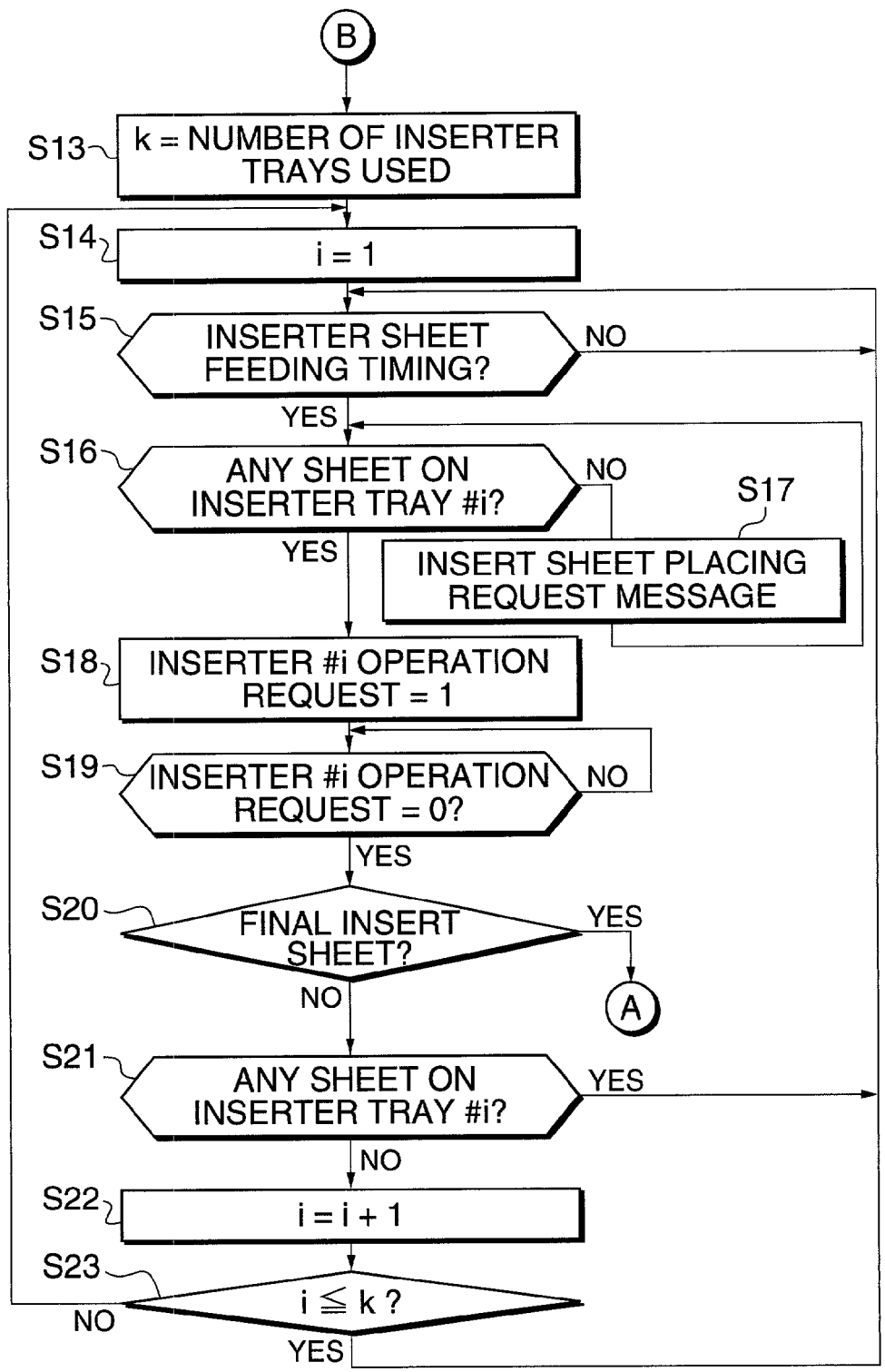
FIG. 9 is a flow chart showing a continuation from FIG. 8.

FIGS. 8 and 9 are a flow chart showing a procedure of inserter operation control for controlling the inserter operation when the insert mode for inserting insert sheets is selected as the copying mode. In the present embodiment, three inserter trays are used, and three pages of insert sheets are to be inserted.

When copy start is instructed by the operating section 40 (step S1), it is determined what stacking mode is used in which the insert sheets are stacked on the inserter trays, that is, whether the stacking mode is S-stacking mode or F-stacking mode (step S2). As described later, this is determined based on a signal input from the operating section 40.

If the stacking mode of the inserter tray is determined to be the S-stacking mode, the number of inserter trays to be used is set to a variable k (step S3).

Next, the number of an inserter tray from which an insert sheet is to be fed first, that is, the number 1 is set to a variable i (step S4). Then, it is determined whether it is timing for inserting an insert sheet or not (step S5). The timing for inserting an insert sheet will be described later with reference to FIGS. 12 and 13. If at this point an inserter sheet feeding timing signal is generated, it is determined that it is the timing for inserting an insert sheet, and then it is determined whether there is an insert sheet on the inserter tray #i or not (step S6). If there is an insert sheet on the inserter tray #i, an inserter tray #i operation request flag is set to 1, that is, a sheet feeding request for an insert sheet from the inserter tray #i is issued to the inserter 104 (step S208). If it is determined at the step S206 that there is no insert sheet on the inserter tray #i, a message is displayed on the display panel 620 to request that insert sheets be placed on the inserter tray #i (step S207), and the process waits for insert sheets to be placed.

In response to the inserter tray #i operation request flag being set to 1, the inserter 104 feeds one insert sheet from the inserter tray #i, and sets the inserter tray #i flag to 0. If after execution of the step S8, it is determined that the inserter tray #i operation request flag has been set to 0 by the inserter 104 (step S9), it is determined whether the variable i is equal to the variable k or not (step S10). If i=k holds, it is determined whether the final insert sheet of the copy job has been fed or not (step S11). If the final insert sheet has not been fed, the process returns to the step S4. If the final insert sheet has been fed, the process of this flow chart is terminated. If i≠k holds in the step S10, the variable i is incremented by one (step S12), and the process returns to the step S5.

If in the step S2, the stacking mode of the inserter tray is determined to be the F-stacking mode, the number of inserter trays (the number of inserter trays) on which insert sheets to be inserted are set is set to the variable k (step S13). Next, the number of an inserter tray from which a sheet is to be fed first, that is, the number 1 is set to the variable i (step S14). Then, it is determined whether it is the timing for inserting an insert sheet or not (step S15). If it is the timing for inserting an insert sheet, it is determined whether there is an insert sheet on the inserter tray #i or not (step S16). If there is a sheet, the inserter tray #i operation request flag is set to 1, that is, a sheet feeding request that the insert sheet be fed from the inserter tray #i is issued to the inserter 104 (step S18). If it is determined at the step S16 that there is no insert sheet on the inserter tray #i, a message is displayed on the display panel 620 requesting that insert sheets be placed on the inserter tray #i (step S17), and the process waits for insert sheets to be placed.

If after execution of the step S18, it is determined that the inserter tray #i operation request flag has been set to 0 by the inserter 104 (step S19), it is determined whether the final insert sheet has been fed or not (step S20). If the final sheet has been fed, the process is terminated. If the final insert sheet has not been fed, it is determined whether there is an insert sheet on the inserter tray #i or not (step S21). If there is an insert sheet, the process returns to the step S15. If there is no insert sheet, the number of an inserter tray from which an insert sheet is to be fed is changed (step S2), and the variable k is compared with the variable i (step S23). If the variable i is equal to or less than the variable k, the process returns to the step S15. If at the step S23, the variable i is greater than the variable k, the process returns to the step S14, to set the variable i to 1.

Thus, if all the insert sheets stacked on the inserter tray #i have been fed, insert sheets are successively fed from an inserter tray #i+1. Therefore, when the F-stacking mode is set, the operation can be continuously run without interruption of the job due to supply of insert sheets by the user to the inserter tray emptied of insert sheets. The operation shown in FIGS. 8 and 9 is controlled by the CPU 2002.

Figure 10:
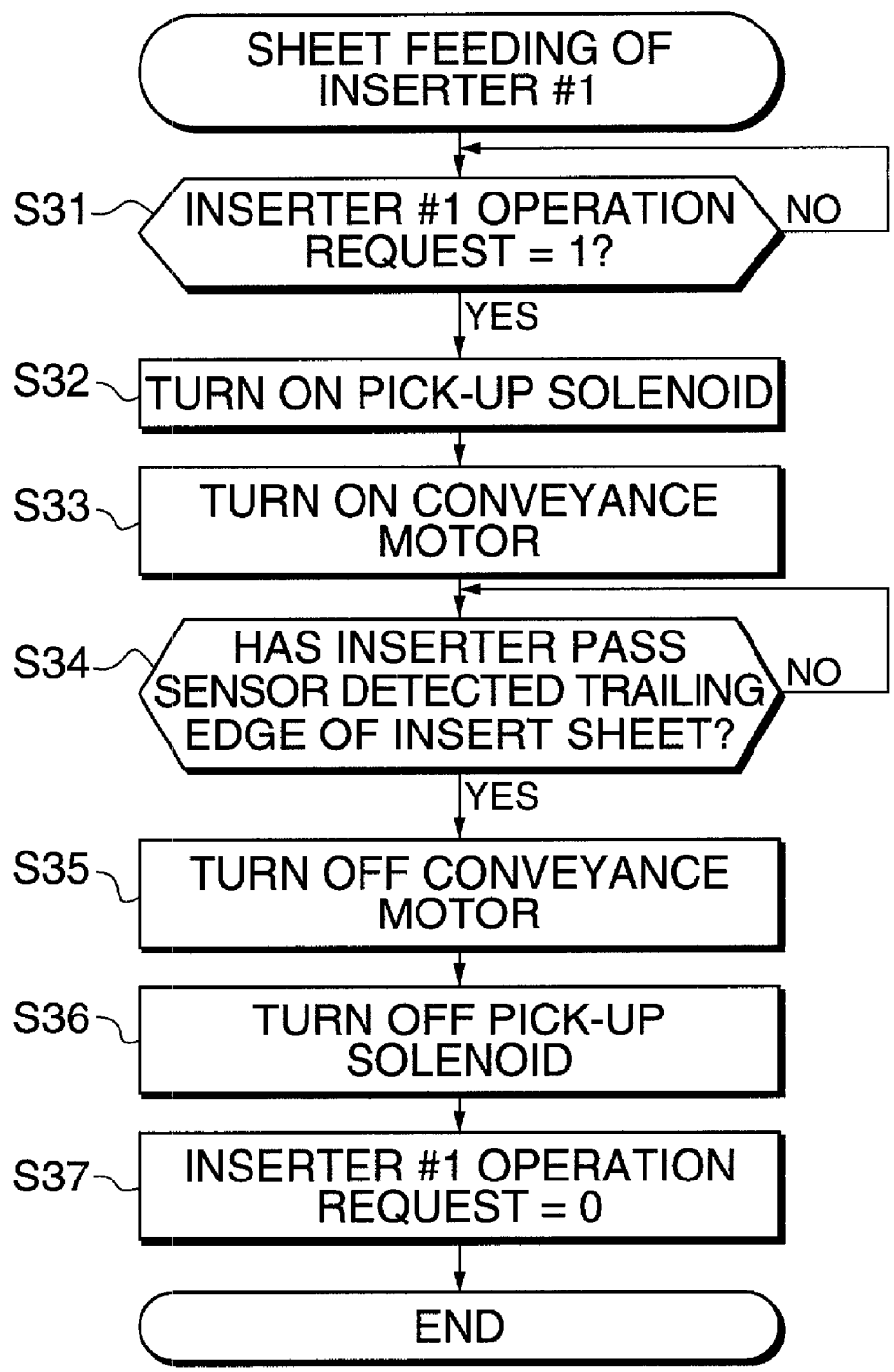
FIG. 10 is a flow chart showing a procedure of a sheet feeding process executed by an inserter appearing in FIG. 1.

FIG. 10 shows a procedure of control of sheet feeding from the inserter. The case where sheets are fed from the inserter tray 20a will be described. When the inserter tray #1 operation request flag is set to 1 by the CPU 2002 (step S31), a sheet feeding solenoid (not shown) for conveying insert sheets stacked on the inserter tray 20a is turned on to cause the sheet feeding roller 21a to be seated onto the insert sheets IS (step S32). Then, in order to convey the insert sheets, a conveyance motor (not shown) for driving the sheet feeding roller 21a is turned on (step S33).

Next, when the inserter pass sensor 41 provided on the conveyance path for the insert sheets detects the passage of the trailing edge of each insert sheet (step S34), the conveyance motor is turned off (step S35).

Next, by turning off the sheet feeding solenoid, the sheet feeding roller 21a is retracted to a position separated from the insert sheets IS. When a series of sheet feeding operations of the inserter 104 are completed, the inserter tray #1 operation request flag is set to 0 (step S37), and the sheet feeding flow of the inserter 104 is terminated.

The above described operation of the inserter 104 refers to the case where insert sheets are fed from the inserter tray 20a. Where insert sheets are fed from the inserter tray 20b or 20c, the operation of the inserter 104 carried out upon the operation request is the same as described above. The operation shown in FIG. 10 is controlled by the CPU 2002.

Figure 11:
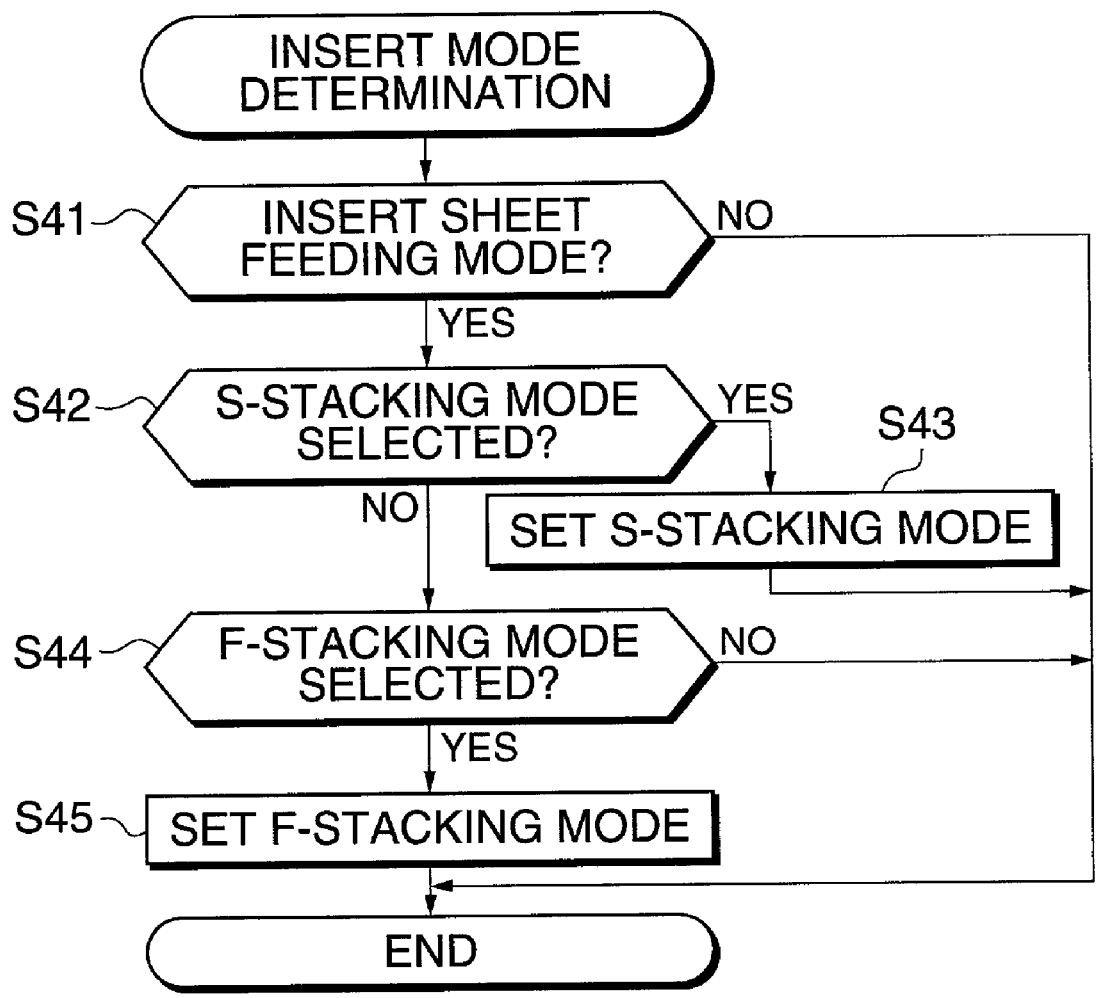
FIG. 11 is a flow chart showing a procedure of an insert mode determining process.

FIG. 11 shows a procedure of insert mode determination.

First, it is determined whether the insert mode has been selected by the operating section 40 or not (step S41). If the insert mode has been selected, it is determined whether the S-stacking mode has been selected as the manner of stacking sheets onto the inserter tray or not (step S42). If the S-stacking mode has been selected, the S-stacking mode is set as the insert mode (step S43). If at the step S42 it is determined that the S-stacking mode has not been selected, it is determined whether the F-stacking mode has been selected or not (step S44). If the F-stacking mode has been selected, the F-stacking mode is set as the insert mode (step S45). The operation shown in FIG. 11 is controlled by the CPU 2002.

Figure 12:
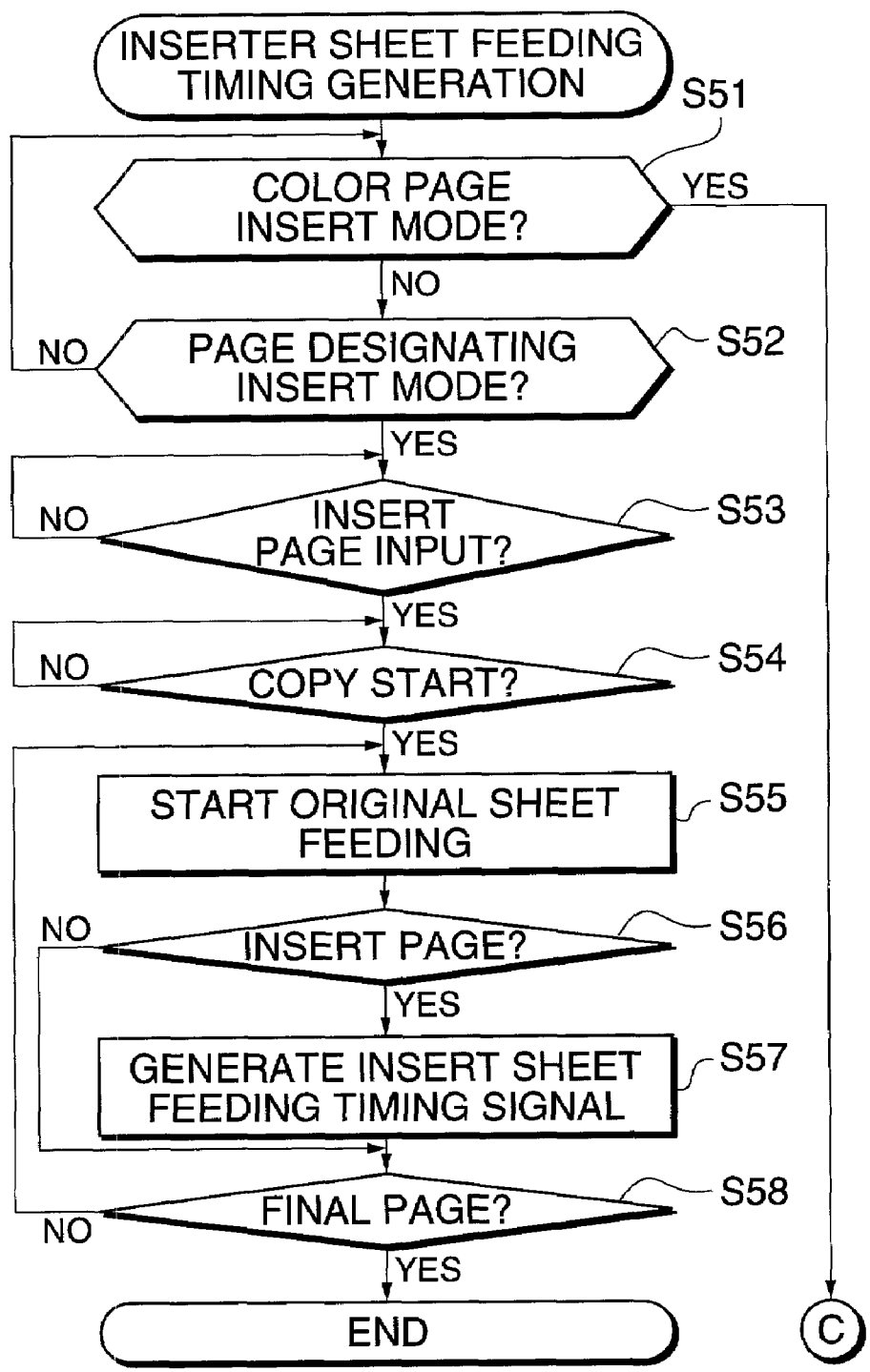
FIG. 12 is a flow chart showing a procedure of an insert sheet feeding timing generation process executed when the insert mode is selected.
Figure 13:
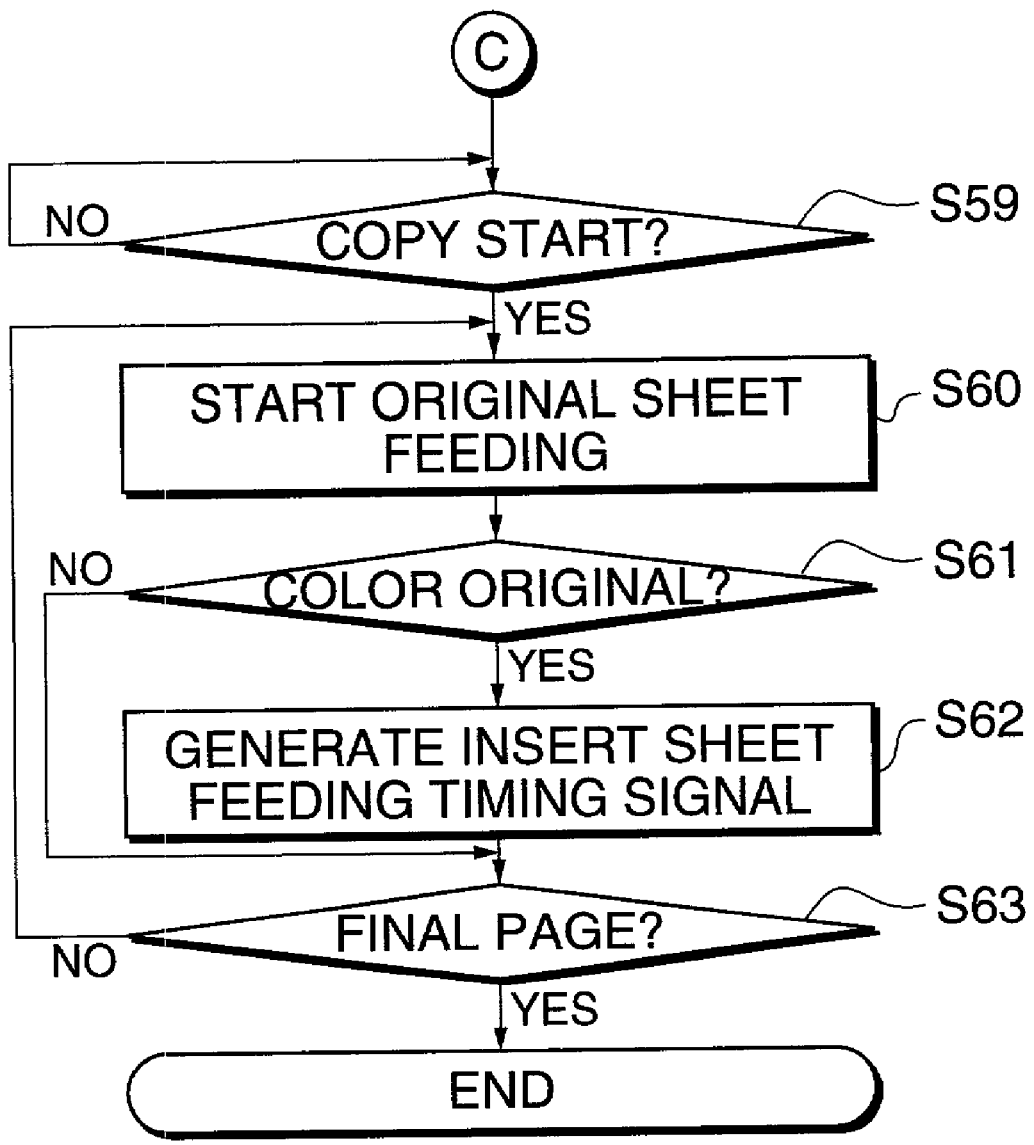
FIG. 13 is a flow chart showing a continuation from FIG. 12.

FIGS. 12 and 13 show a procedure of generation of an inserter sheet feeding timing signal when the insert mode is selected.

First, it is determined whether the color page insert key 638 has been selected by the operating section 40 or not (step S51). If the color page insert key 638 has been selected, the process waits for the copy start key 614 to be selected (step S59).

When it is determined at the step S59 that the copy start key 614 has been selected, feeding of an original is started (step S60). Next, the original is read, and it is determined whether the original is a color original or not (step S61). If the original is determined to be a color original, the inserter sheet feeding timing signal is generated (step S62). Then, it is determined whether the original is the final page of the job or not (step S63). If it is the final page, the process is terminated, and if it is not the final page, the process returns to the step S60.

Figure 7C:
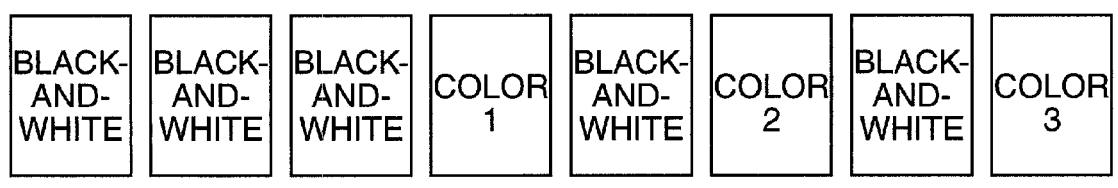
FIG. 7C is a view showing an example of insert sheets inserted between originals.

If it is determined at the step S51 that the color page insert key 638 has not been selected, it is determined whether a page designating insert mode has been selected or not (step S52). If the page designating insert mode has been selected, the process waits for the user to input pages to be inserted. If, for example, among 8 pages of originals, three pages, that is, the 4-th, 6-th and 8-th pages are to be inserted as in FIG. 7C, the user inputs the three page numbers from the operating section 40.

When the insert page numbers have been input (step S53), it is determined whether the copy start key 614 has been selected or not (step S54). If the copy start key 614 has been selected, feeding of the original is started (step S55). Pages of the originals are counted at the same time, and when the count is equal to one of the page numbers that have been input at the step S53 (step S56), the inserter sheet feeding timing signal is generated (step S57).

Next, it is determined whether the page is the final page of the originals or not (step S58). If it is the final page, the process is terminated. If it is not the final page, the process returns to the step S55. The operation shown in FIGS. 12 and 13 is controlled by the CPU 2002.

Figure 14:
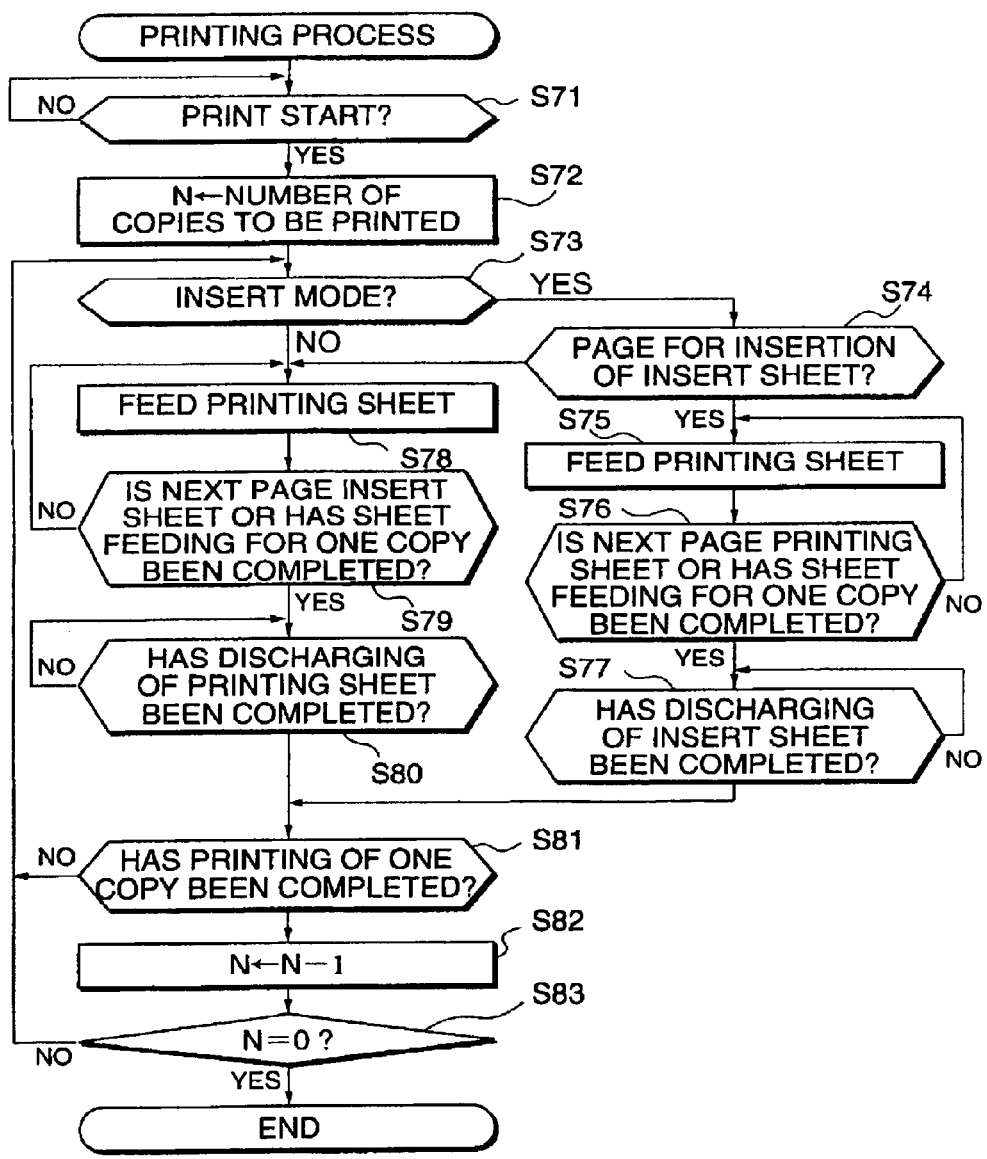
FIG. 14 is a flow chart showing a procedure of a printing process.

FIG. 14 is a flow chart showing a procedure of a printing process.

At a step S71, the process waits for a printing start instruction to be input, and when the printing start instruction is input, the number of copies to be printed is set to N at a step S72, if N copies have been set to be printed.

Next, at a step S73, it is determined whether the insert mode has been set or not. If the insert mode has not been set, an ordinary printing operation is executed at steps S78 through S83. The processing at steps S78 through S83 will be described later.

If the insert mode has been set, it is determined at a step S74 whether the page is a page for an insert sheet to be inserted or not. If it is the page for an insert sheet to be inserted, an insert sheet is fed at a step S75.

At a step S76, it is determined whether the next page is for a print sheet or sheet feeding for one copy has been completed. If the next page is also for an insert sheet to be inserted, the process returns to the step S75 to feed an insert sheet again.

If the next page is for a print sheet, the process waits at a step S77 for the previously fed insert sheet to be discharged.

When this insert sheet has been discharged and yet one copy of printing has not been completed (step S81), the process returns to the step S73, and then proceeds to the steps S74, S78.

Since then the next page is for a print sheet, the process proceeds to the step S78 where a print sheet is fed.

At the following step S79, it is determined whether the next page is for an insert sheet or sheet feeding for one copy has been completed. If it is determined that the next page is again for a print sheet, the process returns to the step S78 where the next print sheet is fed again.

If the next page is for an insert sheet, the process waits at the step S80 for the previously fed print sheet to be discharged.

When this print sheet has been discharged and yet one copy of printing has not been completed (step S81), the process returns to the step S73, and then proceeds to the steps S74, S75. An insert sheet is fed at the step S75, and then the process proceeds from the step S76 to execute processing as described above.

When insert sheets and print sheets have been fed as described above according to processing at the steps S73 through S80 and one copy of printing has been completed at the step S81, the set number of copies is decremented by one at a step S82. Then, the steps S73 through a step S83 are repeated until it is determined at the step S83 that the processing for the set number of copies (N copies) is completed.

Thus, according to the present embodiment, a sheet or sheets for image formation are fed only after an insert sheet has been discharged. Therefore, even if an insert sheet is involved in a paper jam, a subsequent jam recovery process is greatly facilitated.

Figure 15:
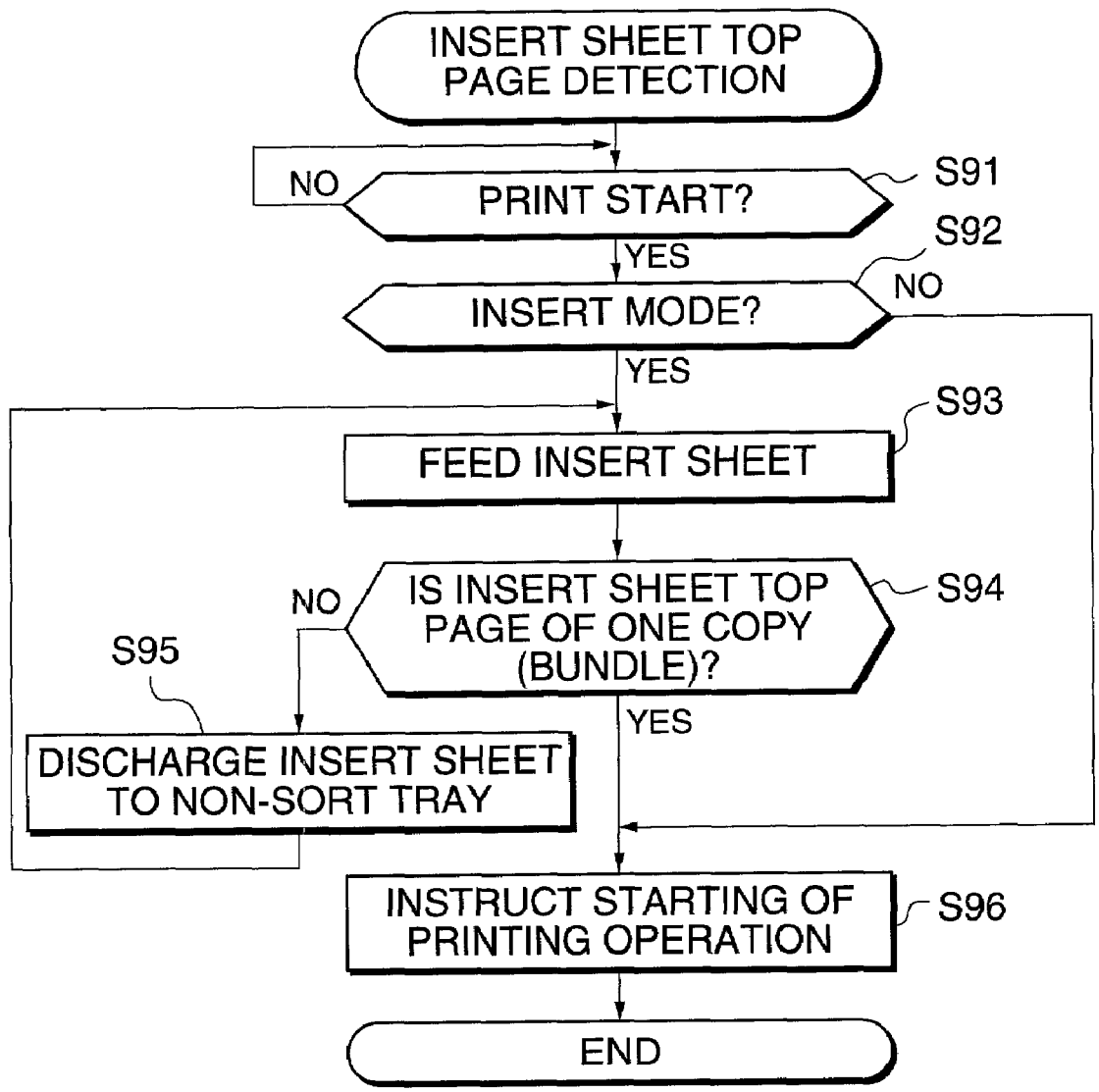
FIG. 15 is a flow chart showing a procedure of an insert sheet top page detection process.

FIG. 15 is a flow chart showing a procedure of an insert sheet top page detection process.

First, at a step S91, the process waits for a printing start instruction to be input. When the printing start instruction is input, it is determined at a step S92 whether the insert mode has been set or not. If the insert mode has not been set, an ordinary printing operation is started at a step S96. If the insert mode has been set, an insert sheet is fed at a step S93, and then, at a step S94 it is determined whether the insert sheet is for a top page of a copy (bundle) or not. This determination as to whether the insert sheet is for the top page or not is made based on the detection result of the bar code reader 100, described before.

Usually, when a sheet for the top page has been properly set on the inserter tray, it is determined as the top page sheet and a proper printing operation in the insert mode is started at a step S96.

If the insert sheet is not determined to be for the top page, it is judged that the insert sheet has not been correctly set on the inserter tray, and then the insert sheet is discharged to a non-sort tray at a step S95. Then, the process returns to the step S93 to feed the next insert sheet. The processing of the steps S93 to S95 is repeated until the insert sheet for the top page is detected at the step S94.

When the insert sheet for the top page is detected, the proper printing operation in the insert mode is started at the step S96.

Figure 16:
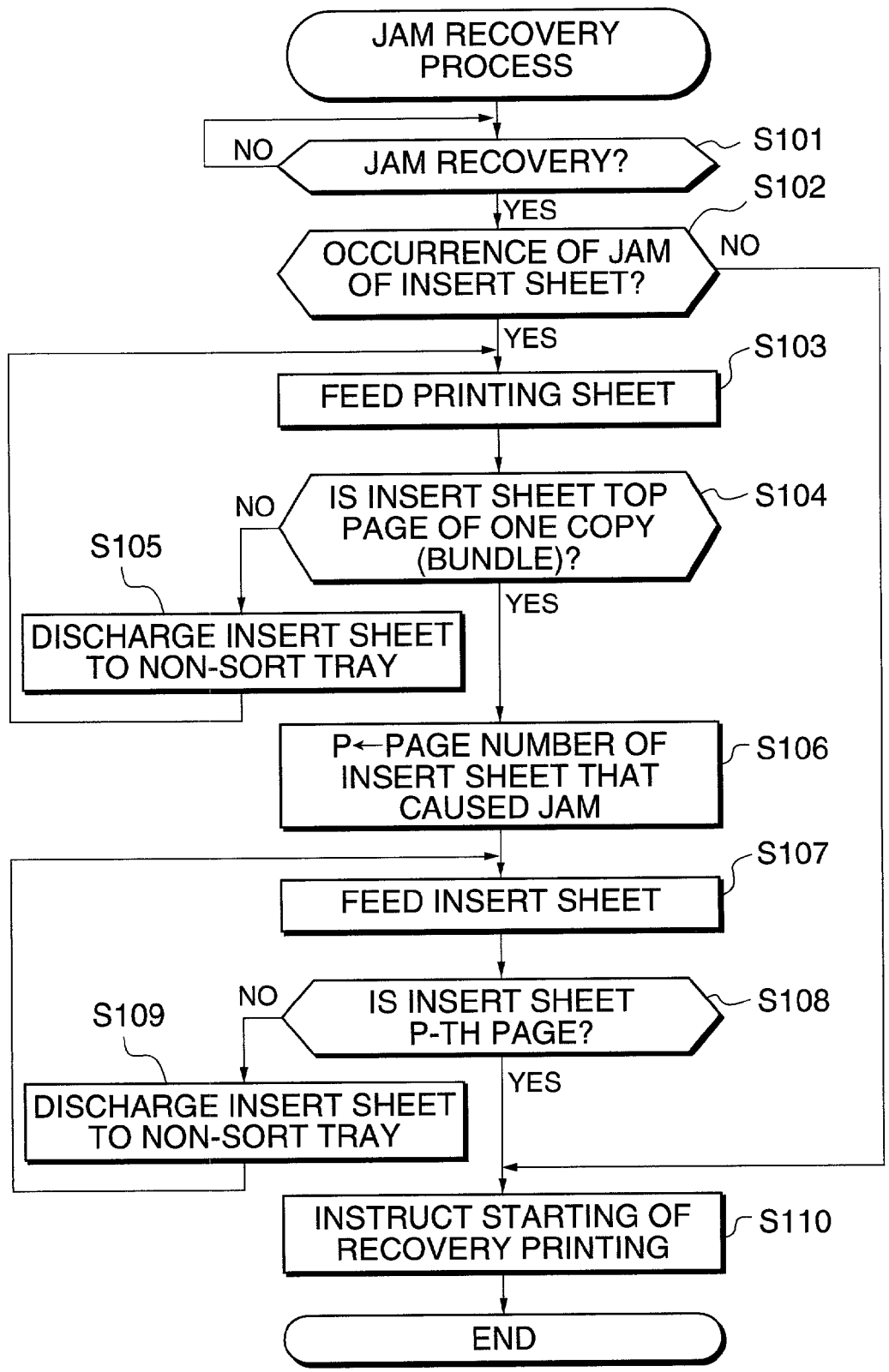
FIG. 16 is a flow chart showing a procedure of an insert sheet jam recovery process.

FIG. 16 is a flow chart showing a procedure of an insert sheet jam recovery process.

First, at a step S101, the process waits for a jam recovery instruction to be input. When the jam recovery instruction is input, it is determined at a step S102 whether a jam of an insert sheet has occurred or not. If an insert sheet jam has not occurred, an ordinary recovery printing of print sheets is started at a step S110.

If an insert sheet jam has occurred, an insert sheet is fed at a step S103, and it is determined at a step S104 whether the insert sheet is for the top page of one copy (bundle).

If it is not determined to be for the top page, the insert sheet is discharged to the non-sort tray at a step S105, and the process returns to the step S103 to feed the next insert sheet. The processing of the steps S103 to S105 is repeated until an insert sheet for the top page is detected at the step S104. The detection of the top page sheet is carried out based on the detection result of the bar code reader 100, as in the above-mentioned step S94.

When the insert sheet for the top page is detected, the process proceeds to a step S106, where the page number of the insert sheet which jammed is set to P.

At the next step S107, an insert sheet is again fed, and it is determined at a step S108 whether the insert sheet is for the Pth page or not.

If the insert sheet is not for the Pth page, the insert sheet is discharged to the non-sort tray, and the process returns to the step S107 to feed the next insert sheet. The processing of the steps S107 to S109 is repeated until an insert sheer for the Pth page is detected at the step S108.

When the insert sheet for the Pth page is detected, a proper printing recovery operation in the insert mode is started at a step S110.

In this manner, according to the present embodiment, where insert sheets for a plurality of pages are stacked on one inserter tray, even if the order of pages to be fed is disrupted due to a sheet jam or the like, an insert sheet for the top page is detected to thereby enable the page order to be recovered correctly.

In the above described embodiment, as described with reference to FIGS. 7A and 7B, two types of stacking modes, i.e. S-stacking mode and F-stacking mode, are employed, and accordingly two types of modes of feeding insert sheets from the inserter are employed.

If the S-stacking mode is selected, an S mode is set. This will be explained with reference to FIG. 7A. Insert sheets are inserted between sheets fed from the image forming unit 62 in the order of the uppermost sheet (P1) on the inserter tray 20a→the uppermost sheet (P2) on the inserter tray 20b→the uppermost sheet (P3) on the inserter tray 20c. Then, to form a second copy, a similar sheet insertion operation is again carried out starting with the sheet (P1), which is then the uppermost, on the inserter tray 20a, followed by repeating this cycle of insertion.

If the F-stacking mode is selected, an F mode is set. This will be explained with reference to FIG. 7B. Insert sheets are inserted between sheets fed from the image forming unit 62 starting with the uppermost sheet on the inserter tray 20a, and if it is detected by the sensor 27a that no sheet is present on the inserter tray 20a (by this time, three copies have been outputted), the sheet feeding source is switched to the inserter tray 20b. Thereafter, insert sheets are sequentially fed from the inserter starting with the uppermost sheet on the inserter tray 20b. No switching of the sheet feeding source is carried out until all sheets are exhausted from the inserter tray 20b. When all the sheets are subsequently exhausted from the inserter tray 20b (by this time, six copies have been outputted), the sheet feeding source is switched to the inserter tray 20c.

In the above embodiment having the two types of modes, whether to execute the insert sheet top page detection process shown in FIG. 15, described above, as a process to be executed for recovery from a jam of an insert sheet or sheets, is determined based upon whether the S mode or the F mode is set.

For example, when the F mode is set, the insert sheet top page detection process is executed (including the determination as to whether the insert sheet is for the top page or not made based on the result of bar code recognition, and a process wherein if the insert sheet is determined not to be the top page, it is discharged as it is as an invalid sheet to the sample tray 85, while if the insert sheet is determined to be the top page, it is used as a valid insert sheet in executing th recovery process).

On the other hand, when the S mode is set, it means that all sheets on the same inserter tray are for the same page, and therefore execution of the above top page detection process is inhibited. Then, the uppermost inserter sheet (for the same page as the jammed insert sheet) on an inserter tray on which the jammed inserter sheet was stacked is used as an inserter sheet to be inserted first in executing the recovery process.

This can dispense with the bar code recognition process or the like, and irrespective of whether the S mode or the F mode is set, the time required to complete the job after the start of the recovery process can be shortened compared with the case where the above insert sheet top page detection process is executed, to thereby enhance the productivity.

Further, although in the above described embodiment, insert sheets are fed in a manner bypassing the image forming unit, the present invention may be applied to other constructions, such as a construction that inserter trays are arranged on the right side of the image forming apparatus main body as viewed in FIG. 1, a construction that insert sheets are fed from a sheet feeding device such as a manual feed tray provided in the image forming apparatus main body, or a construction that insert sheets are fed into a finisher via an image forming unit (even in this construction, insert sheets merely pass through a conveyance path in the image forming unit and no image formation on the insert sheets is effected by the image forming unit).

It is to be understood that the present invention may also be realized by supplying a system or an apparatus with a storage medium in which the program code of software that realizes the function of the above described embodiment is recorded, and causing a computer (or CPU, MPU) of the system or apparatus to read out and execute the program code stored in the storage medium.

In this case, the program code itself read out from the storage medium realizes the above described functions of the embodiment, so that the storage medium storing the program code also constitutes the present invention.

The storage medium for supplying the program code may be selected from, for example, a floppy disk, hard disk, optical disk, magneto-optical disk, CD-ROM, CD-R, magnetic tape, non-volatile memory card, and ROM. The program code may be supplied via a communication network from a server computer.

The functions of the above described embodiment may be accomplished not only by executing a program code read out by a computer, but also by causing an operating system (OS) that operates on the computer, to perform a part or the whole of the actual operations according to instructions of the program code.

Furthermore, it is to be understood that the program code read out from the storage medium may be written into a memory provided in an expanded board inserted in the computer, or an expanded part connected to the computer, and a CPU, or the like, provided in the expanded board or expanded part may actually perform a part or the whole of the operations according to the instructions of the program code, so as to accomplish the functions of the above described embodiment.

What is claimed is:

1. An image forming apparatus comprising:
inputting means for inputting images;
image forming means for forming images on blank sheets based on the input images;
stacking means for stacking a plurality of bundles of insert sheets, wherein each bundle has insert sheets corresponding to n pages, which are to be inserted between the sheets having images formed thereon by said image forming means, in a predetermined order of pages in which the insert sheets corresponding to the n pages are to be inserted, and wherein the insert sheets corresponding to the n pages in each bundle are inserted in a single bundle of one copy set including the sheets having the images formed thereon by said image forming means;

inserter means for feeding the stacked insert sheets so as to be inserted between said sheets having images formed thereon;

reading means for reading identification information assigned to the insert sheets and generating an output indicating the read identification information;

designating means for designating at least one insertion position in said sheets having images formed thereon for insertion of at least one of the insert sheets by said inserter means;

detecting means for detecting based on the output of said reading means whether or not the insert sheet fed is for a top page in one of the bundles of insert sheets; and discharging means operable when said detecting means detects that the insert sheet fed by said inserter means after a printing start instruction has been given is not the insert sheet for the top page, for discharging insert sheets onto an escape tray until the insert sheet for the top page is detected by said detecting means.

2. An image forming apparatus according to claim 1, further comprising post-processing means for stacking said sheets having images formed thereon by said image forming means in a fashion mixed with insert sheets inserted by said inserter means, and for carrying out post-processing on the mixedly stacked sheets.

3. An image forming apparatus according to claim 2, wherein said discharging means discharges said insert sheets to a location other than said post-processing means.

4. An image forming apparatus according to claim 1, comprising a conveyance path for insert sheets, and wherein said detecting means is provided on said conveyance path for insert sheets.

5. An image forming apparatus comprising:

inputting means for inputting images;

image forming means for forming images on blank sheets based on the input images;

stacking means for stacking a plurality of bundles of insert sheets, wherein each bundle has insert sheets corresponding to n pages, which are to be inserted between the sheets having images formed thereon by said image forming means, in a predetermined order of pages in which the insert sheets corresponding to n pages are to be inserted, and wherein the insert sheets corresponding to the n pages in each bundle are inserted in a single bundle of one copy set including the sheets having the images formed thereon by said image forming means;

inserter means for performing a sheet inserting operation to feed the stacked insert sheets so as to be inserted between said sheets having images formed thereon;

reading means for reading identification information assigned to the insert sheets and generating an output indicating the read identification information;

designating means for designating at least one insertion position in said sheets having images formed thereon for insertion of at least one of the insert sheets by said inserter means;

interrupting means for interrupting the sheet inserting operation of said inserter means when at least one of the insert sheets has jammed while being subjected to the sheet inserting operation by said inserter means;

detecting means for detecting based on the output of said reading means whether or not the insert sheet fed is for a top page in one of the bundles of insert sheets; and discharging means operable when said detecting means detects that the insert sheet fed first by said inserter means after a restart of the sheet inserting operation is not the insert sheet for the top page for discharging insert sheets onto an escape tray until the insert sheet for the top page is detected, and for further discharging insert sheets onto the escape tray up to an insert sheet immediately preceding a same page of insert sheet as the at least one jammed insert sheet.

6. An image forming apparatus according to claim 5, further comprising post-processing means for stacking said sheets having images formed thereon by said image forming means in a fashion mixed with insert sheets inserted by said inserter means, and for carrying out post-processing on the mixedly stacked sheets.

7. An image forming apparatus according to claim 6, wherein said discharging means discharges said insert sheets to a location other than said post-processing means.

8. An image forming apparatus according to claim 5, comprising a conveyance path for insert sheets, and wherein said detecting means is provided on said conveyance path for insert sheets.

9. A control method of controlling an image forming apparatus, comprising the steps of:

inputting images by inputting means;

forming images on blank sheets based on the input images by image forming means;

feeding insert sheets from a plurality of bundles of insert sheets stacked by stacking means, wherein each bundle has insert sheets corresponding to n pages, which are to be inserted between the sheets having images formed thereon by said image forming means, in a predetermined order of pages in which the insert sheets corresponding to the n pages are to be inserted, and wherein the insert sheets corresponding to the n pages in each bundle are inserted in a single bundle of one copy set including the sheets having the images formed thereon by said image forming means;

feeding the stacked insert sheets by inserter means between the sheets having images formed thereon by said image forming means;

reading identification information assigned to the insert sheets and generating an output indicating the read identification information by reading means;

designating at least one insertion position in said sheets having images formed thereon for insertion of at least one of the insert sheets by said inserter means, by designating means;

detecting based on the output of said reading means by detecting means whether or not the insert sheet fed is for a top page in one of the bundles of insert sheets; and discharging insert sheets by discharging means onto an escape tray until the insert sheet for the top page is detected when said detecting means detects that the insert sheet fed by said inserter means after a print start instruction has been given is not the insert sheet for the top page.

10. A control method according to claim 9, further comprising the steps of stacking said sheets having images formed thereon by said image forming means in a fashion mixed with insert sheets inserted by said inserter means, and carrying out post-processing on the mixedly stacked sheets, by post-processing means.

11. A control method according to claim 10, wherein said discharging step comprises discharging said insert sheets to a location other than said post-processing means.

12. A control method according to claim 9, wherein said detecting means is provided on a conveyance path for insert sheets.

13. A control method of controlling an image forming apparatus, comprising the steps of:
   inputting images by inputting means;
   forming images on blank sheets based on the input images by image forming means;
   feeding insert sheets from a plurality of bundles of insert sheets stacked by stacking means, wherein each bundle has insert sheets corresponding to n pages, which are to be inserted between the sheets having images formed thereon by said image forming means, in a predetermined order of pages in which the insert sheets corresponding to the n pages are to be inserted, and wherein the insert sheets corresponding to the n pages in each bundle are inserted in a single bundle of one copy set including the sheets having the images formed thereon by said image forming means;
   performing a sheet inserting operation by inserter means to feed the stacked insert sheets so as to be inserted between the sheets having images formed thereon by said image forming means;
   reading identification information assigned to the insert sheets and generating an output indicating the read identification information by reading means;
   designating at least one insertion position in said sheets having images formed thereon for insertion of at least one of the insert sheets by said inserter means, by designating means;
   interrupting the sheet inserting operation of said inserter means by interrupting means when at least one of the insert sheets has jammed while being subjected to the sheet inserting operation by said inserter means;
   detecting based on the output of said reading means whether or not the insert sheet fed is for a top page in one of the bundles of insert sheets by detecting means; and
   discharging insert sheets onto an escape tray until the insert sheet for the top page is detected, and further discharging insert sheets onto the escape tray up to an insert sheet immediately preceding a same page of insert sheet as the at least one jammed insert sheet, by discharging means, when said detecting means detects that the insert sheet fed first by said inserter means after a restart of the sheet inserting operation is not the insert sheet for the top page.

14. A control method according to claim 13, further comprising the steps of stacking said sheets having images formed thereon by said image forming means in a fashion mixed with insert sheets inserted by said inserter means, and carrying out post-processing on the mixedly stacked sheets, by post-processing means.

15. A control method according to claim 14, wherein said discharging step comprises discharging said insert sheets to a location other than said post-processing means.

16. A control method according to claim 13, wherein said detecting means is provided on a conveyance path for insert sheets.

17. An image forming apparatus according to claim 1, wherein said reading means reads code information that is the identification information assigned to the insert sheets.

18. An image forming apparatus according to claim 5, wherein said reading means reads code information that is the identification information assigned to the insert sheets.

19. An image forming apparatus according to claim 17, wherein the code information is a bar code.

20. An image forming apparatus according to claim 18, wherein the code information is a bar code.

21. An image forming apparatus according to claim 1, wherein said reading means reads a page number that is the identification information assigned to the insert sheets.

22. An image forming apparatus according to claim 5, wherein said reading means reads a page number that is the identification information assigned to the insert sheets.

* * * * *